(12) United States Patent
Takayama et al.

(10) Patent No.: US 7,882,446 B2
(45) Date of Patent: Feb. 1, 2011

(54) SYSTEM FOR SELLING, BUYING, LENDING, AND RENTING VIRTUAL REGION AND METHOD THEREOF

(75) Inventors: Kuniharu Takayama, Kawasaki (JP); Yoshiharu Maeda, Kawasaki (JP); Hirohisa Naito, Kawasaki (JP); Minoru Sekiguchi, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 235 days.

(21) Appl. No.: 12/273,257

(22) Filed: Nov. 18, 2008

(65) Prior Publication Data

US 2009/0125423 A1 May 14, 2009

Related U.S. Application Data

(63) Continuation of application No. 09/799,503, filed on Mar. 7, 2001, now Pat. No. 7,527,191.

(30) Foreign Application Priority Data

Nov. 2, 2000 (JP) ............................... 2000-335884

(51) Int. Cl.
G06F 3/048 (2006.01)
G06Q 30/00 (2006.01)

(52) U.S. Cl. ..................... 715/765; 715/848; 705/26

(58) Field of Classification Search .............. 715/760, 715/765, 848; 705/1, 16, 26, 35, 38
See application file for complete search history.

(56) References Cited

U.S. PATENT DOCUMENTS

| | | | |
|---|---|---|---|
| 4,319,332 A | 3/1982 | Mehnert | |
| 5,675,746 A | 10/1997 | Marshall | |
| 5,889,951 A | 3/1999 | Lombardi | |
| 6,057,856 A | 5/2000 | Miyashita | |
| 6,215,498 B1 * | 4/2001 | Filo et al. | 345/419 |
| 6,289,325 B1 | 9/2001 | Nakamura et al. | |
| 6,381,583 B1 | 4/2002 | Kenney | |
| 6,397,221 B1 * | 5/2002 | Greef et al. | 1/1 |
| 6,505,174 B1 | 1/2003 | Keiser et al. | |
| 6,580,441 B2 | 6/2003 | Schileru-Key | |
| 6,708,172 B1 | 3/2004 | Wong et al. | |

(Continued)

FOREIGN PATENT DOCUMENTS

EP 08996774 A2 3/1999

(Continued)

OTHER PUBLICATIONS

Notice of Rejection Grounds mailed Jul. 31, 2007 in Japanese application 2001-327465, Mailing No. 376649, No. 0170258, 3 pages.

(Continued)

*Primary Examiner*—Andrew Joseph Rudy
(74) *Attorney, Agent, or Firm*—Staas & Halsey LLP

(57) ABSTRACT

The right for correlating a region or an existence with a virtual region in a virtual world structured in for example the Internet is sold, bought, lent, or rented. For example, when a buyer bought a virtual region from a seller, the virtual region of the seller is correlated with a virtual region of the buyer in a link method, a paste method, or a projection method.

2 Claims, 28 Drawing Sheets

U.S. PATENT DOCUMENTS

| | | |
|---|---|---|
| 6,744,436 B1 | 6/2004 | Chirieleison et al. |
| 6,782,369 B1 * | 8/2004 | Carrott .................. 705/10 |
| 6,915,274 B2 | 7/2005 | Abhyanker |
| 6,954,728 B1 | 10/2005 | Kusumoto et al. |
| 6,954,734 B1 | 10/2005 | Kuelbs et al. |
| 7,004,388 B2 | 2/2006 | Kohta |
| 7,006,988 B2 | 2/2006 | Lin et al. |
| 7,013,289 B2 | 3/2006 | Horn et al. |
| 7,120,932 B2 | 10/2006 | Lockhart et al. |
| 7,130,807 B1 | 10/2006 | Mikurak |
| 7,139,796 B2 | 11/2006 | Rekimoto et al. |
| 7,143,057 B2 | 11/2006 | Kuelbs et al. |
| 7,168,051 B2 | 1/2007 | Robinson et al. |
| 7,177,819 B2 | 2/2007 | Muncaster et al. |
| 7,177,836 B1 | 2/2007 | German et al. |
| 7,266,511 B2 | 9/2007 | Teshima |

FOREIGN PATENT DOCUMENTS

| | | |
|---|---|---|
| JP | 08-063416 | 3/1996 |
| JP | 10-207684 | 8/1998 |
| JP | 11-085841 | 3/1999 |
| JP | 2000-293530 | 10/2000 |
| WO | WO 96/07151 | 3/1996 |

OTHER PUBLICATIONS

"Go for a megahit page! Homepage building from scratch", Internal ASCII, ASCII Corporation, Jul. 1, 1999, vol. 4, No. 7, pp. 130-137.

"Monthly Computer Digest", T A C Kikaku Inc., Feb. 10, 1999, vol. 25, No. 2, p. 92.

K. Matsuda, "VRML of Today and Introduction to CyberPassage System" VRML2.0 and Java-(1) bit, Jul. 1996, vol. 28, No. 7, Kyoritus Shuppan Co., Ltd., Jul. 1, 1996, pp. 29-36.

R. Lea, et al., "JAVA for 3D and VRML Worlds, JAVA+VRML", Internet Books, Prentice Hall Japan, Jun. 10, 1997.

U.S. Appl. No. 09/799,503, filed Mar. 7, 2001, Kuniharu Takayama, et al., Assignee Fujitsu Limited.

* cited by examiner

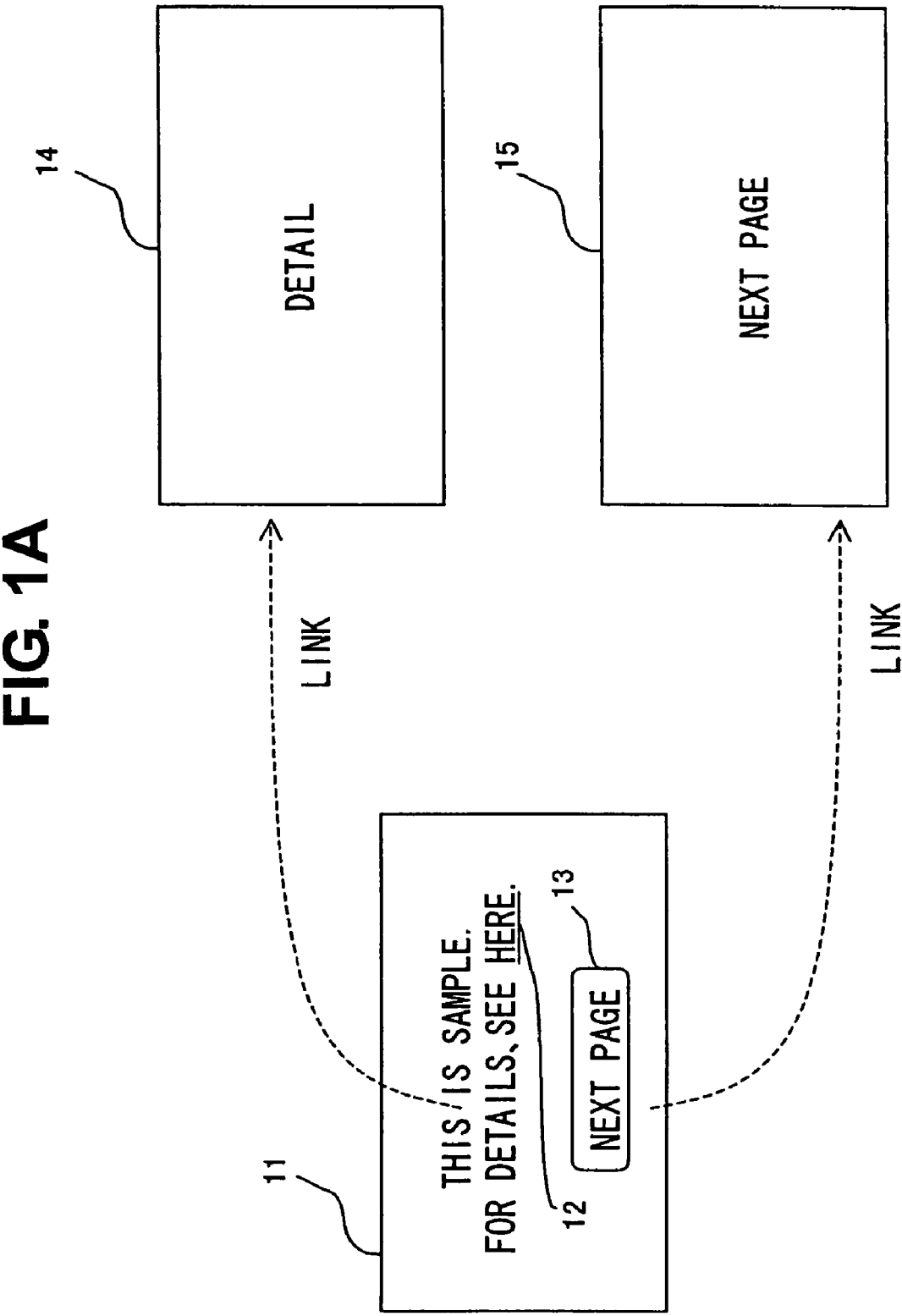

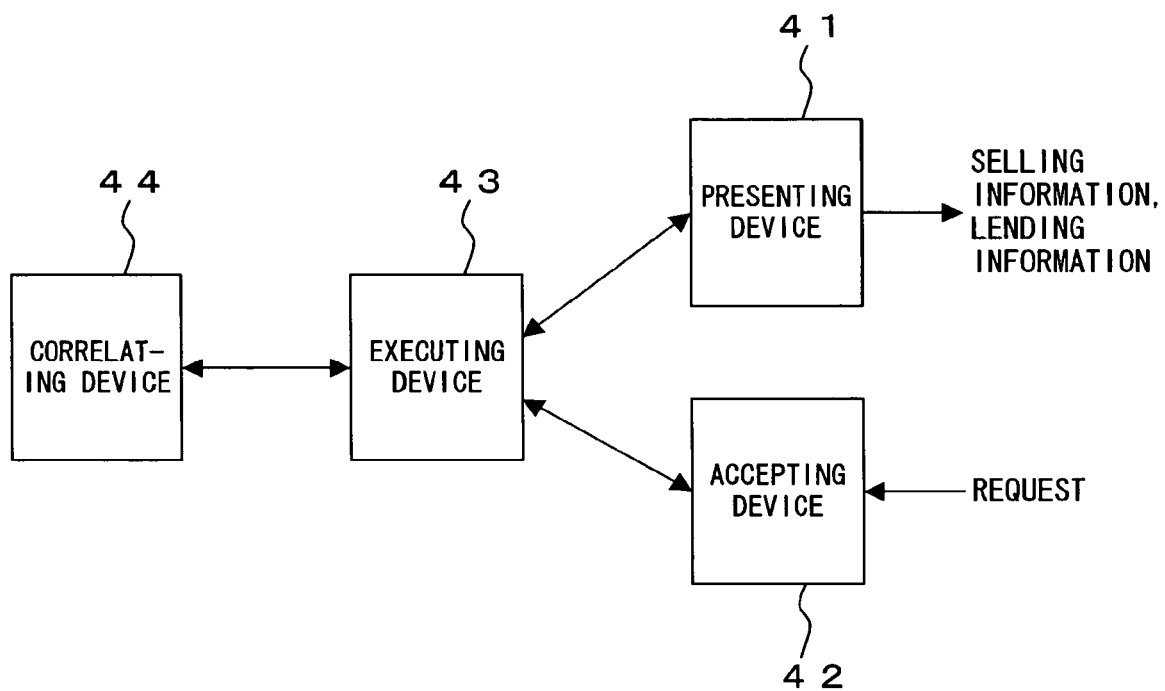
F I G. 2 A

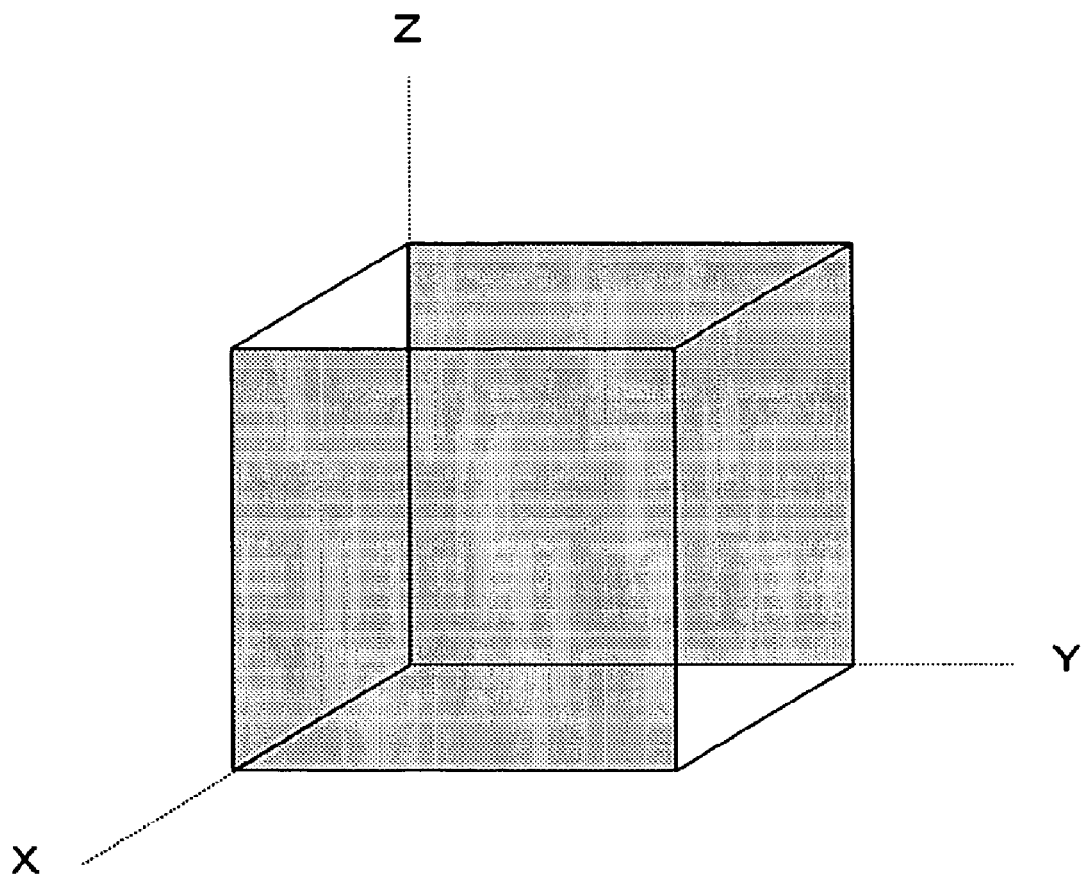
F I G. 3

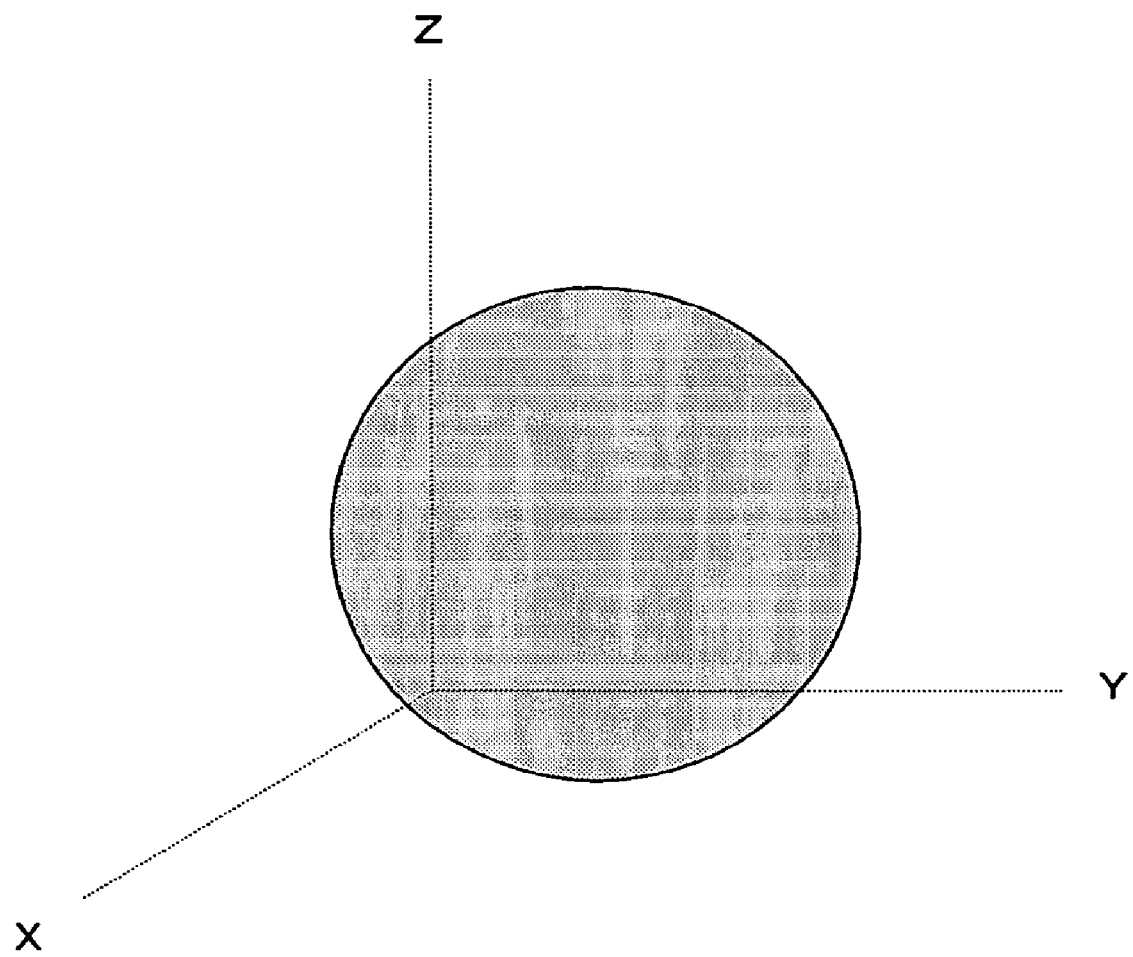
F I G. 4

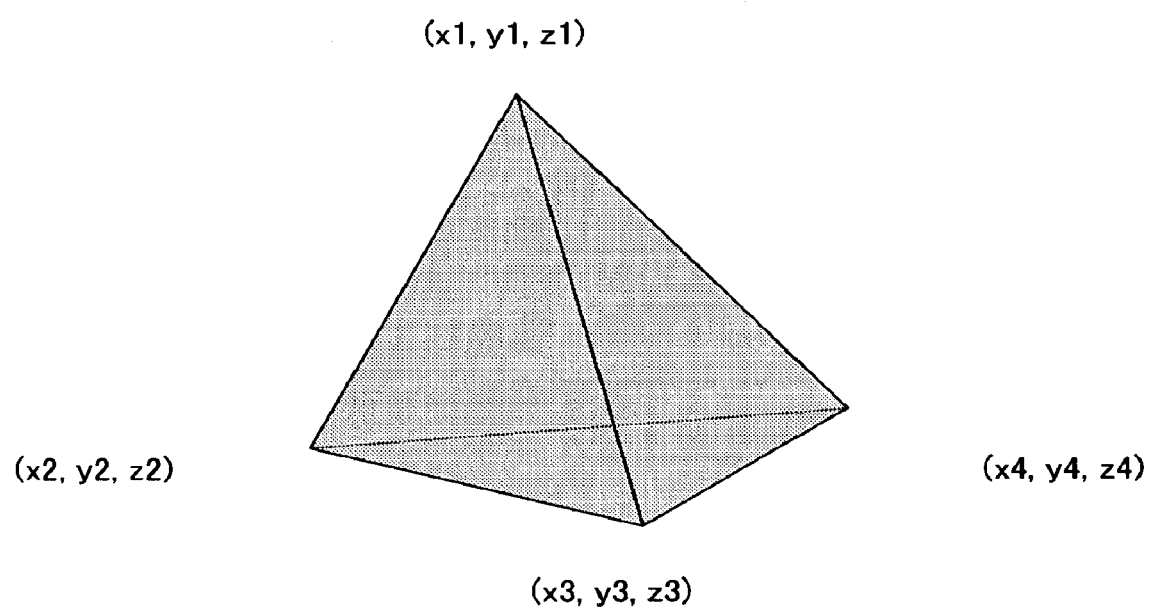
F I G. 5

SYSTEM FOR SELLING, BUYING, LENDING, AND RENTING VIRTUAL REGION AND METHOD THEREOF

CROSS REFERENCE TO RELATED APPLICATION

This application is a continuation of U.S. application Ser. No. 09/799,503 filed Mar. 7, 2001, now U.S. Pat. No. 7,527,191, which is based on and hereby claims priority to Japanese Application No. 2000-335884 filed on Nov. 2, 2000 in Japan, the contents of which are hereby incorporated by reference.

BACKGROUND OF THE INVENTION

1. Field of the Invention

The present invention relates to a system for selling, buying, lending, and renting a virtual region in a virtual world structured in the Internet or the like and a method thereof.

2. Description of the Related Art

Hereinafter, a two-dimensional spread is referred to as plane, whereas a three-dimensional spread is referred to as space. A part of a plane or a space is referred to as region. A plane, a space, and various existences are together referred to as world. In this case, existences are for example mountains, rivers, buildings, and so forth.

As shown in FIG. 1A, on the web of the Internet, virtual two-dimensional planes referred to as pages are accomplished by correlating them using a technology referred to as link. In FIG. 1A, on a page 11 displayed on the screen, links 12 and 13 are designated. When the user selects the link 12 with a mouse, a detail information page 14 is displayed. When the user selects the link 13, the next page 15 is displayed.

FIG. 1B shows a method for displaying these pages. In FIG. 1B, a server 21 is for example a personal computer (PC) that provides page information. A client 22 is a PC of a user 23 who receives page information. The server 21 comprises a processing portion 31 and a communicating portion 32. The client 22 comprises a communicating portion 33, a processing portion 34, an inputting portion 35, and an outputting portion 36.

When the user 23 inputs an address (unique identifier) "http://xxx/file-01.html" of a desired web page stored in the server 21 to the inputting portion 35 of the client 22, the input request is sent to the processing portion 31 of the server 21 through a network. As a result, the server 21 sends a file of the web page to the client 22. The outputting portion 36 displays/outputs the page 11. When the user selects the links 12 and 13, the pages 14 and 15 are output, respectively.

However, the above-described conventional system has the following problem.

In future, the web will be extended to a virtual three-dimensional space. A particular region of a particular virtual space is correlated with a particular region of another virtual space. As a result, the user can jump from one virtual region to another virtual region. In addition, the user may see a particular virtual region from another virtual region.

In such a situation, like the real world in which real estates and buildings are lent, rented, sold, and bought, in a virtual world, virtual regions of three-dimensional spaces and two-dimensional planes will be sold, bought, lent, and rented. Although methods and apparatuses that accomplish virtual three-dimensional spaces have been used, it seems that methods and apparatuses that allow virtual spaces to be sold, bought, lent, and rented and correlatively used have not been proposed.

SUMMARY OF THE INVENTION

An object of the present invention is to provide a system that allows a virtual region in such a virtual world to be sold, bought, lent, and rented and a method thereof.

According to the first aspect of the present invention, a selling system comprises a presenting device, an accepting device, an executing device, and a correlating device. The selling system performs a process for selling a virtual region in a virtual world.

The presenting device presents selling information about a virtual region of a selling object in a virtual world. The accepting device accepts a message that represents that a buyer will buy the virtual region of the selling object and information about the buyer. The executing device transfers the right for correlating a processing object with the virtual region of the selling object to the buyer, using at least one of a virtual existence and a virtual region in the virtual world, a virtual existence and a virtual region in another virtual world, and a real existence and a real region in a real world as the processing object. The correlating device correlates identification information of the processing object with identification information of the virtual region of the selling object.

According to the second aspect of the present invention, a lending system comprises a presenting device, an accepting device, an executing device, and a correlating device. The lending system performs a process for lending a virtual region in a virtual world.

The presenting device presents lending information about a virtual region of a lending object in a virtual world. The accepting device accepts a message that represents that a renter will rent the virtual region of the lending object and information about the renter. The executing device lends the right for correlating a processing object with the virtual region of the lending object to the renter, using at least one in a virtual existence and a virtual region in the virtual world, a virtual existence and a virtual region in another virtual world, and a real existence and a real region in a real world as the processing object. The correlating device correlates identification information of the processing object with identification information of the virtual region of the lending object.

These and other objects, features and advantages of the present invention will become more apparent in light of the following detailed description of a best mode embodiment thereof, as illustrated in the accompanying drawings.

BRIEF DESCRIPTION OF DRAWINGS

FIG. 1A is a schematic diagram showing links of web pages;

FIG. 2A is a block diagram showing the principle of a system of the present invention;

FIG. 3 is a first virtual existence;

FIG. 4 is a second virtual existence;

FIG. 5 is a schematic diagram showing a virtual region;

DESCRIPTION OF PREFERRED EMBODIMENT

Figure 1B:
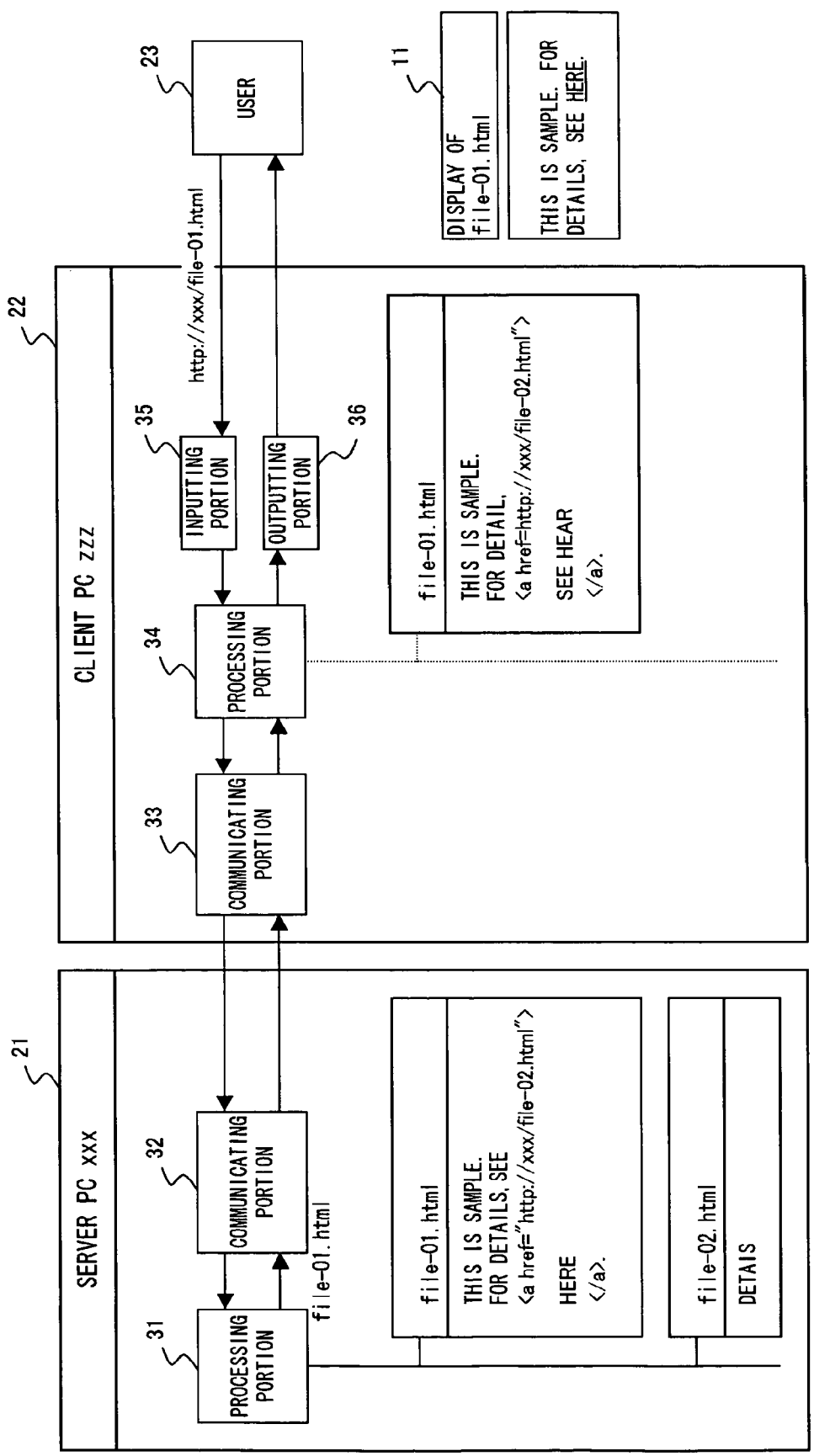
FIG. 1B is a schematic diagram showing a displaying method for a web page.

Next, with reference to the accompanying drawings, an embodiment of the present invention will be described in detail.

FIG. 2A is a block diagram showing the principle of a system according to the present invention. The system shown in FIG. 2A comprises a presenting device 41, an accepting device 42, an executing device 43, and a correlating device 44.

In the first aspect of the present invention, the system shown in FIG. 2A performs a process for selling a virtual region in a virtual world. The presenting device 41 presents selling information about a virtual region of a selling object in a virtual world. The accepting device 42 accepts a message that represents that a buyer will buy the virtual region of the selling object and information about the buyer. The executing device 43 transfers the right for correlating a processing object with the virtual region of the selling object to the buyer, using at least one of a virtual existence and a virtual region in the virtual world, a virtual existence and a virtual region in another virtual world, and a real existence and a real region in a real world as the processing object. The correlating device 44 correlates identification information of the processing object with identification information of the virtual region of the selling object.

Each virtual region in a virtual world has unique identification information. Thus, each virtual region can be correlated with a virtual existence or a virtual region in the same virtual world, a virtual existence or a virtual region in another virtual world, and a real existence or a real region in a real world.

The presenting device 41 presents selling information through the Internet or the like. When a reader who read the selling information requests the seller to sell the selling object, the accepting device 42 accepts the information of the reader as information of the buyer. As a result, the executing device 43 transfers the right for correlating the processing object designated by the buyer with the virtual region of the selling object to the buyer.

The correlating device 44 correlates the identification information of the processing object with the identification information of the virtual region of the selling object in a predetermined format. As a result, the buyer can use the virtual region. According to such a system, a virtual region in a virtual world can be sold and bought.

In the second aspect of the present invention, the system shown in FIG. 2A performs a process for lending a virtual region in a virtual world. The presenting device 41 presents lending information about a virtual region of a lending object in a virtual world. The accepting device 42 accepts a message that represents that a renter will rent the virtual region of the lending object and information about the renter. The executing device 43 lends the right for correlating a processing object with the virtual region of the lending object to the renter, using at least one of a virtual existence and a virtual region in the virtual world, a virtual existence and a virtual region in another virtual world, and a real existence and a real region in a real world as the processing object. The correlating device 44 correlates identification information of the processing object with identification information of the virtual region of the lending object.

The presenting device 41 presents lending information through the Internet or the like. When a reader who read the lending information requests the lender to lend the lending object, the accepting device 42 accepts the information of the browser as information of the renter. As a result, the executing device 43 transfers the right for correlating the processing object designated by the renter with the virtual region of the lending object to the renter.

The correlating device 44 correlates the identification information of the processing object with the identification information of the virtual region of the lending object in a predetermined format. As a result, the renter can use the virtual region. According to such a system, a virtual region in a virtual world can be lent and rented.

Figure 2B:
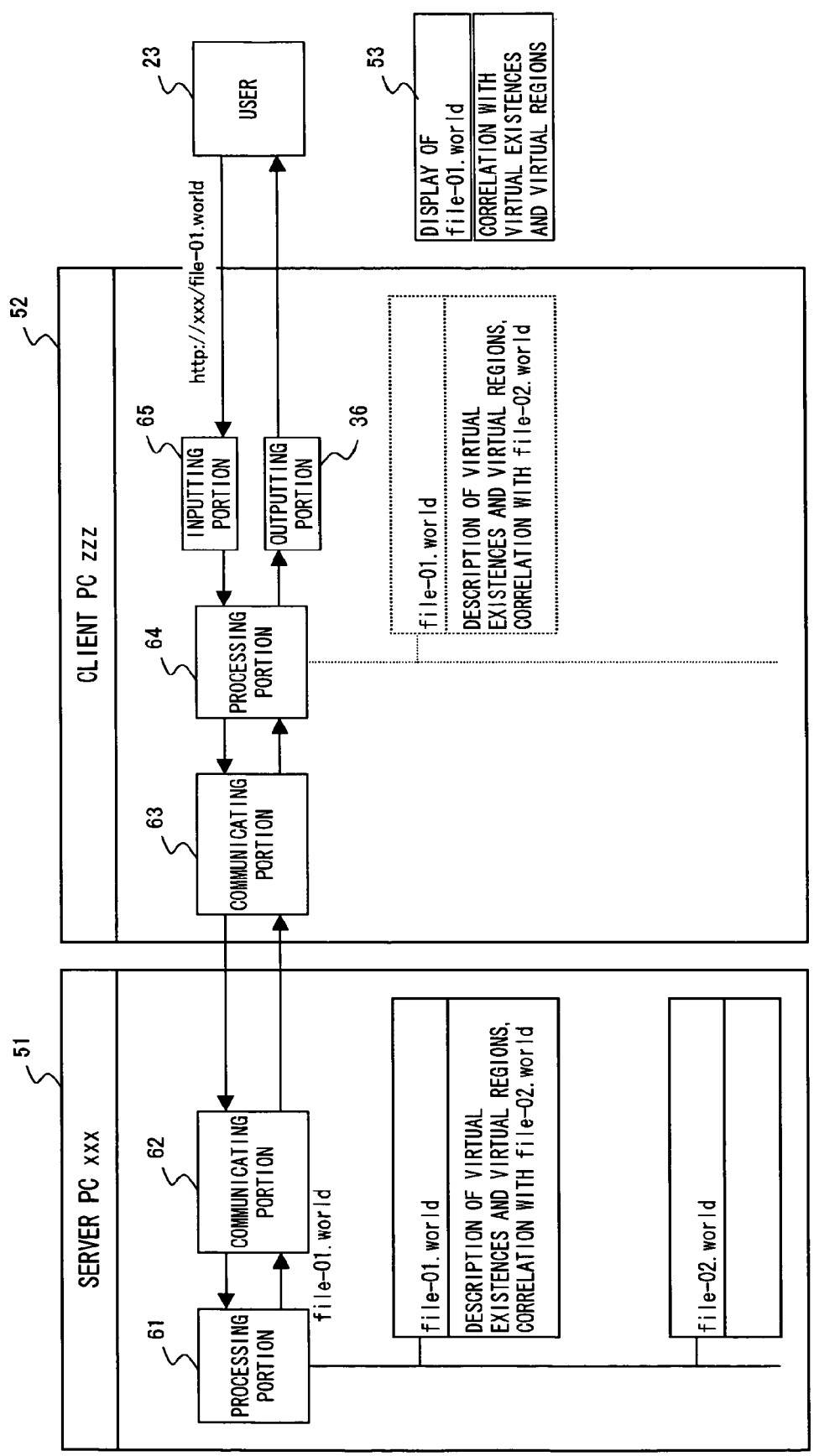
FIG. 2B is a schematic diagram showing a displaying method for a virtual world.

For example, the presenting device 41 shown in FIG. 2A corresponds to the presenting portion 111 shown in FIGS. 19, 21, 23, and 24. The accepting device 42 shown in FIG. 2A corresponds to the accepting portion 112 shown in FIGS. 19, 21, 23, and 24. In addition, for example, the executing device 43 shown in FIG. 2A corresponds to the transferring portion 113 shown in FIGS. 19 and 21 and to the permitting portion 120 shown in FIGS. 23 and 24. The correlating device 44 shown in FIG. 2A corresponds to the processing portion 61 shown in FIG. 2B.

According to the embodiment of the present invention, like street numbers and addresses in the real world, unique identifiers are assigned to individual virtual regions in a three-dimensional space and a two-dimensional plane of a virtual world. Selling prices and lending prices are designated to the virtual regions. As a result, particular virtual regions in the virtual world can be sold, bought, lent, and rented. For example, the user can buy a virtual space of a virtual shopping center and open a virtual store therein. Alternatively, the user can rent a virtual plane in a virtual square and project a real world scene thereto.

Next, with reference to FIGS. 2B to 15, a method for structuring a virtual world by the system according to the embodiment of the present invention will be described.

FIG. 2B shows a method for displaying a virtual world by the system according to the embodiment of the present invention. In FIG. 2B, a server 51 comprises a processing portion 61 and a communicating portion 62. A client 52 comprises a communicating portion 63, a processing portion 64, an inputting portion 65, and an outputting portion 66.

When a user 23 inputs a unique identifier (address) "http://xxx/file-01.world" of a desired virtual world stored in the server 51 to the inputting portion 65 of the client 52, the inputting portion 65 notifies the processing portion 64 of the information. The processing portion 64 generates a relevant file request. The communicating portion 63 transmits the request to the server 51 through a network.

The communicating portion 62 of the server 51 notifies the processing portion 61 of the received request. The processing portion 61 extracts the information of the requested file and transmits it to the client 52 through the communicating portion 62. The communicating portion 63 of the client 52 sends the received information to the processing portion 64. The processing portion 64 sends the information to the outputting portion 66. The outputting portion 66 displays and/or prints data 53 of the relevant virtual world.

The file file-01.world describes a virtual existence and a virtual region in the virtual world, a correlation with another virtual world, and so forth. When the file file-01.world is described in for example XML (extensible Markup Language), the file is coded as follows.

---
file-01.world
---
```
<world>
    <existence id = "existence-01">
        <cube center = "1.0, 1.0, 1.0" length = "2.0">
    </existence>
    <existence id = "existence-02">
        <sphere center = "1.0, 1.0, 1.0" radius = "1.0">
    </existence>
    <space id = "space-01">
        <cube center = "1.0, 1.0, 1.0" length = "2.0">
    </space>
    <space id = "space-02">
        <polyhedra>
            <point no = "1" > x1, y1, z1 </point>
            ...
            <point no = "4" > x4, y4, z4 </point>
            <surface> 1, 2, 3 </surface>
            ...
            <surface> 2, 3, 4 </surface>
        </polyhedra>
    </space>
</world>
```
---

In that case, data is described using a hierarchical structure of elements. "existence" and "space" represent an element of a virtual existence and an element of a virtual region, respectively. The virtual world is represented using the xyz coordinate system. The first virtual existence (existence-01) corresponds to a cube as shown in FIG. 3. The second virtual existence (existence-02) corresponds to a sphere as shown in FIG. 4. The first virtual region (space-01) corresponds to a region of a cube similar to the cube shown in FIG. 3. The second virtual region (space-02) corresponds to a region of a tetrahedron as shown in FIG. 5.

In addition, the file also describes correlation information with another file file-02.world along with the above-described virtual existences and virtual regions. As a result, data of the two different files is correlated. Information of these files is displayed together. The file file-02.world can store data of another virtual world or data of a real world.

Figure 6:
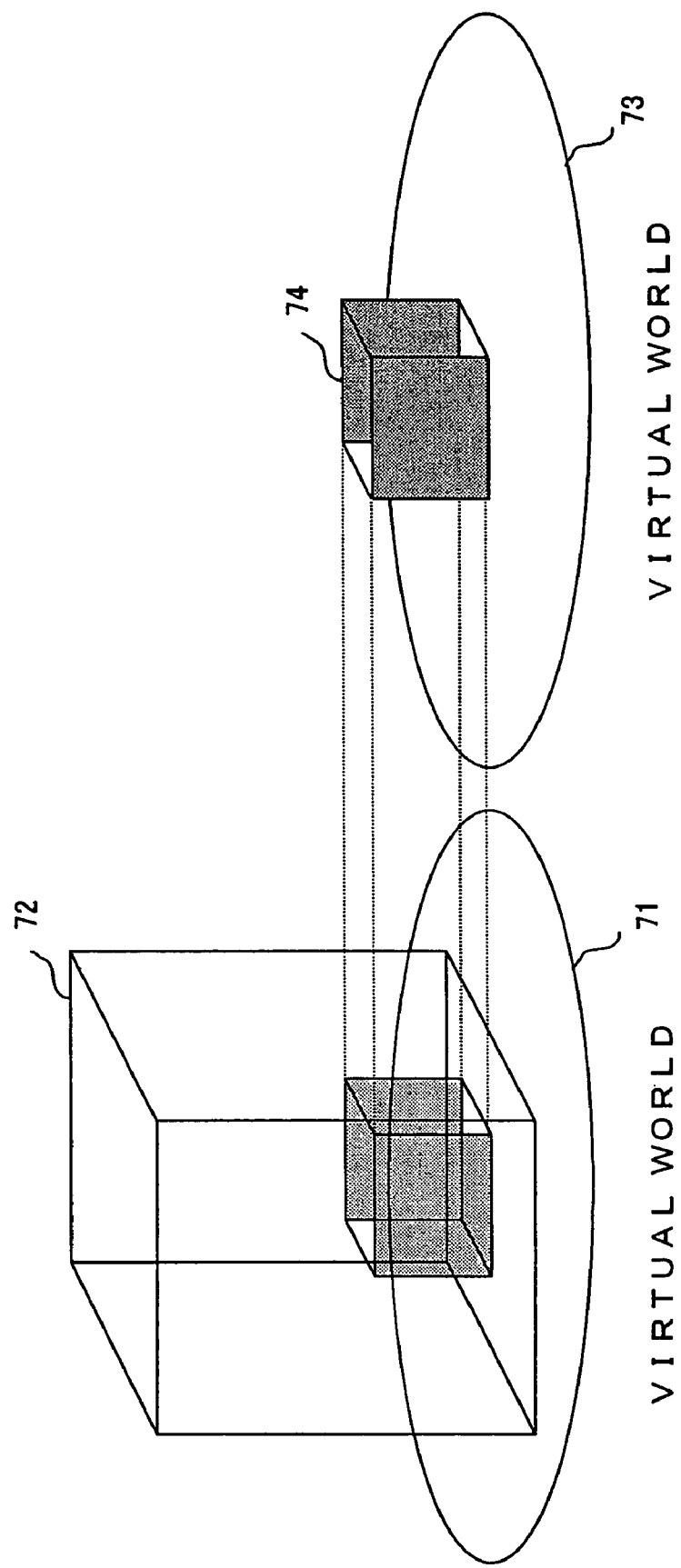
FIG. 6 is a schematic diagram showing a correlation of virtual worlds.

Generally, each of two correlated files contains data of a virtual world or data of a real world. The correlation can be categorized as the following three cases:

(1) a virtual world is correlated with another virtual world
(2) a real word is correlated with a virtual world
(3) a virtual world is correlated with a real world FIG. 6 shows an example of which a virtual world is correlated with another virtual world. In FIG. 6, a virtual region 74 in a virtual world 73 is correlated with a virtual region 72 in another virtual world 71. Instead of the virtual region 74, a virtual existence may be correlated with the virtual region 72. In such a correlation, a virtual store in a virtual world may be opened in a virtual shopping mall in another virtual world. Alternatively, a virtual advertisement tower may be disposed in a virtual square in a virtual world.

Figure 7:
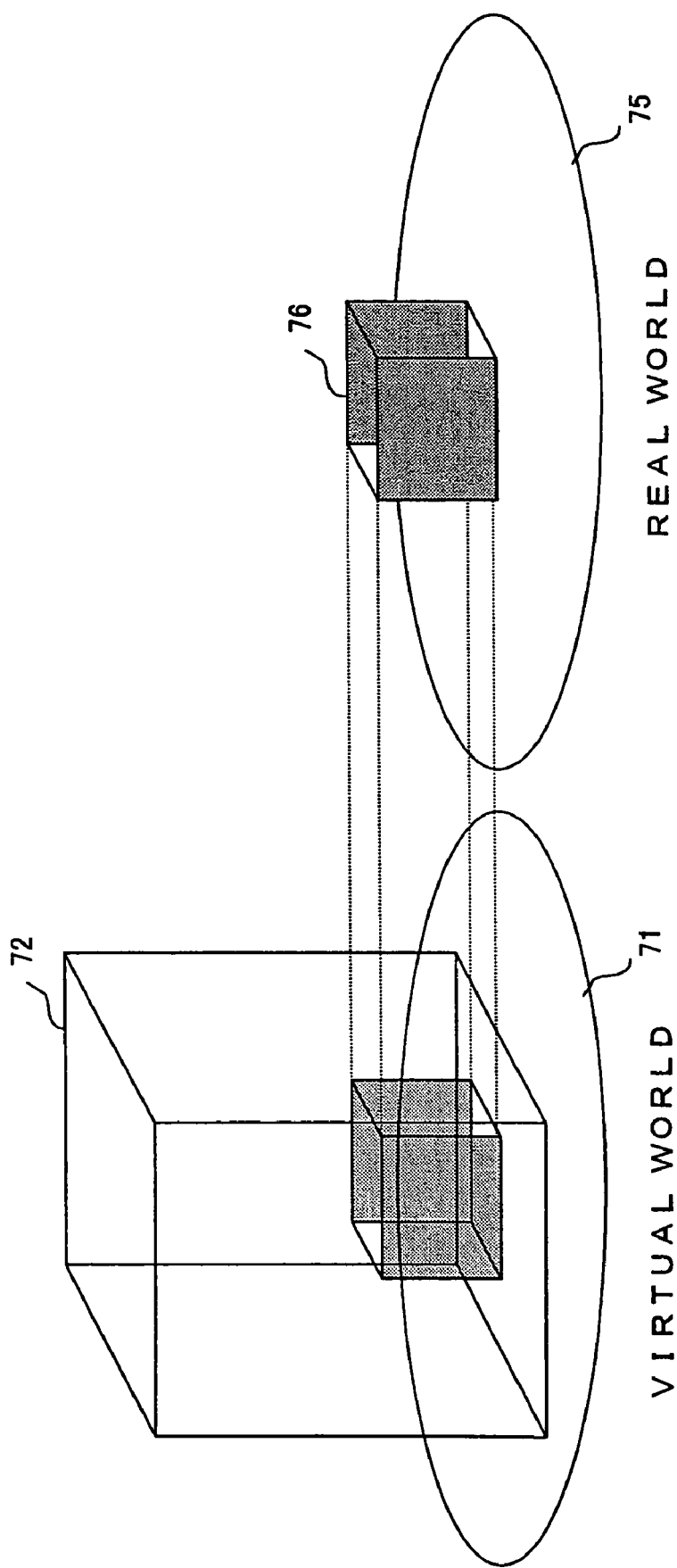
FIG. 7 is a schematic diagram showing a first correlation of a virtual world and a real world.

FIG. 7 shows an example of which a real world is correlated with a virtual world. In FIG. 7, a real region 76 in a real world 75 is correlated with a virtual region 72 in a virtual world 71. A real existence instead of the real region 76 may be correlated with the virtual region 72. With such a correlation, a scene of a place in a real world can be projected to a square in a virtual world.

Figure 8:
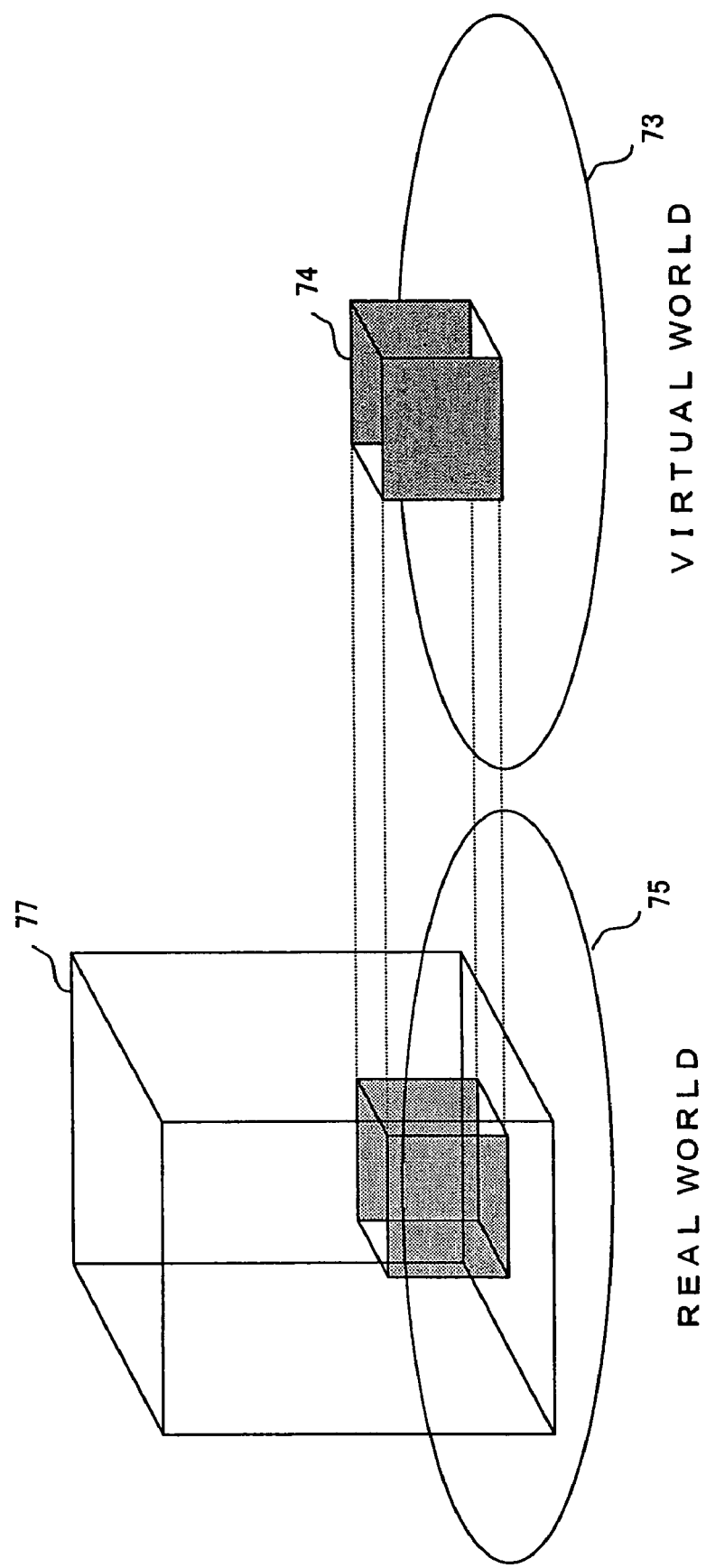
FIG. 8 is a schematic diagram showing a second correlation of a virtual world and a real world.

FIG. 8 shows an example of which a virtual world is correlated with a real world. In FIG. 8, a virtual region 74 in a virtual world 73 is correlated with a real region 77 in a real world 75. A virtual existence instead of the virtual region 74 may be correlated with the real region 77. With such a correlation, a virtual existence can be displayed as a holography to a real world. Alternatively, a virtual existence can be superimposed as a head-mount display image in a real world.

Such a correlation is described with an element "bind". There are three types of correlations that are a link correlation, a paste correlation, and a projection correlation.

In the case of a link correlation, while a virtual existence or a virtual region in a virtual world is being displayed on a web browser, when the user selects the virtual existence or the virtual region with a mouse, the virtual existence or the virtual region is switched to a virtual existence or a virtual region in another virtual world like a web page. Thus, the virtual existence or the virtual region in the virtual world linked to the selected virtual existence or virtual region is displayed. When a "return" function of the web browser is used, the virtual existence or virtual region in the other virtual world is switched to the virtual existence or virtual region in the original virtual world.

Figure 9:
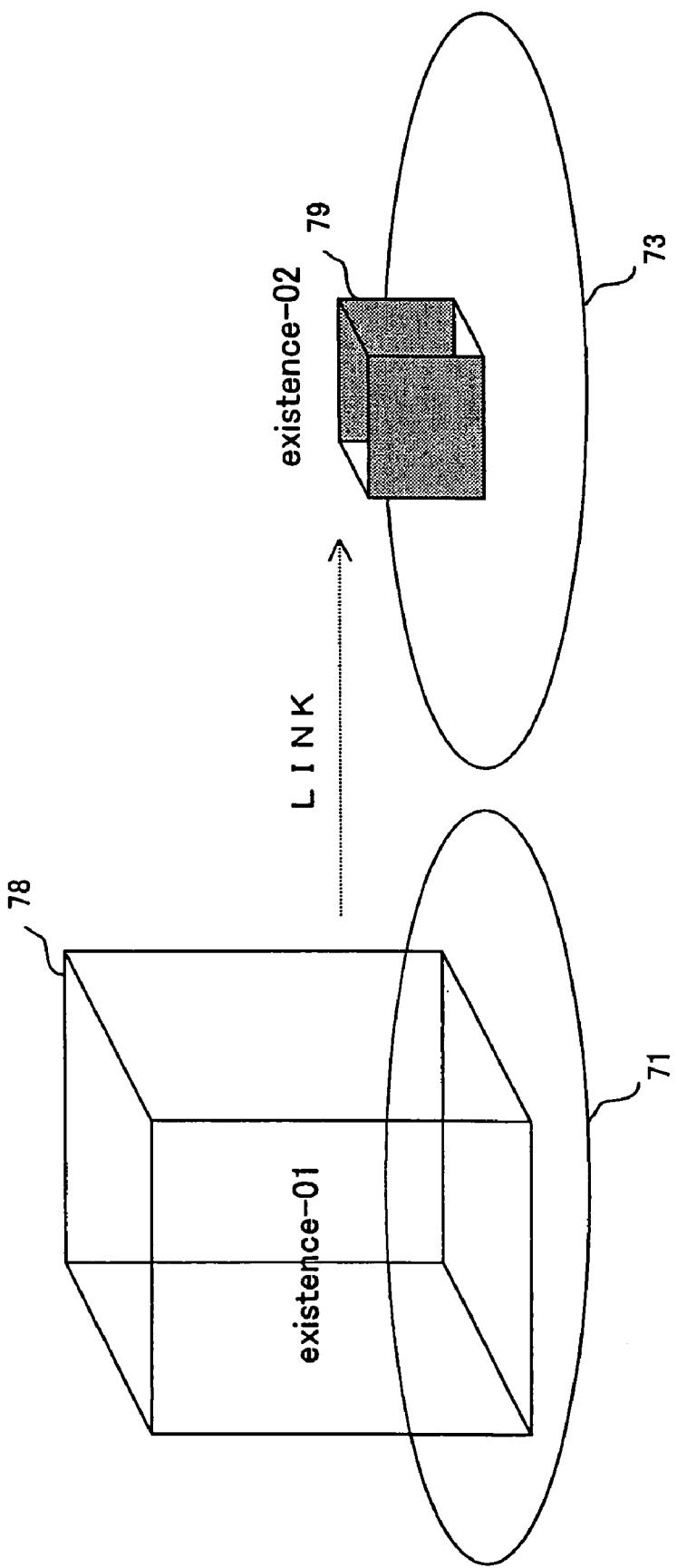
FIG. 9 is a schematic diagram showing a link to a virtual existence.

FIG. 9 shows an example of a link to a virtual existence. A link from a virtual existence 78 in a virtual world 71 to a virtual existence 79 in a virtual world 73 can be coded as follows.

---
file-01.world
---
```
<world>
    <bind type = "link" to = "http://xxx/file-02.world/#exisence-02">
        <existence id = "existence-01">
            <cube center = "1.0, 1.0, 1.0" length = "2.0">
        </existence>
    </bind>
</world>
```
---

"type" is an attribute that represents the correlation type. type="link" represents that the correlation type is link. "to" is an attribute that represents a unique identifier of a correlated object. In the example, a virtual existence of a cube having a unique identifier "existence-01" is linked to a virtual existence having a unique identifier "http://xxx/file-02.world/#existence-02">.

Figure 10:
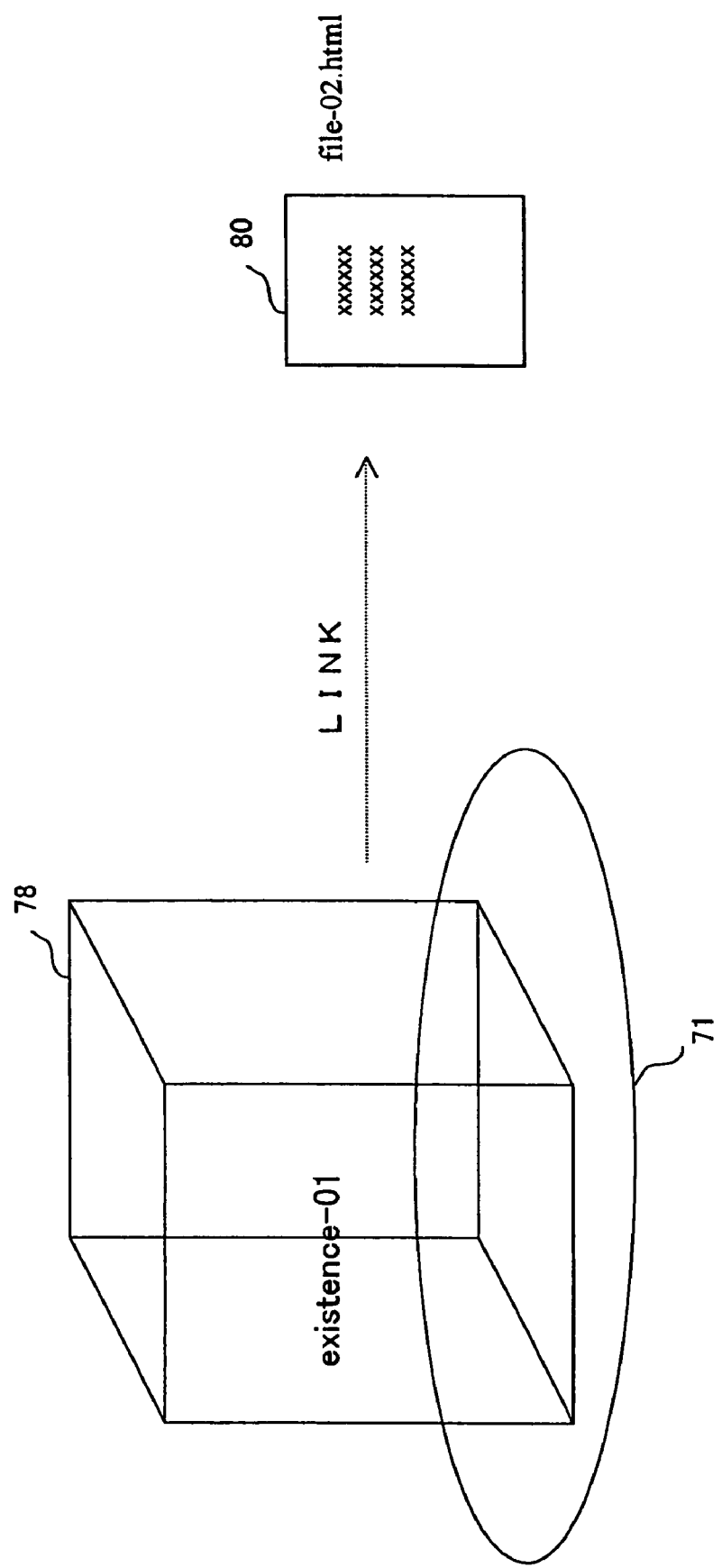
FIG. 10 is a schematic diagram showing a link to a web page.

FIG. 10 shows an example of a link to another web page. A web page 80 is stored as a virtual existence on the web. For example, a link from a virtual space 78 to a web page 80 can be coded as follows.

---
fiel-01.world
---
```
<world>
    <bind type = "link" to = "http://xxx/file-02.html">
        <existence id = "existence-01">
            <cube center = "1.0, 1.0, 1.0" length = "2.0">
        </existence>
    </bind>
</world>
```
---

Figure 11:
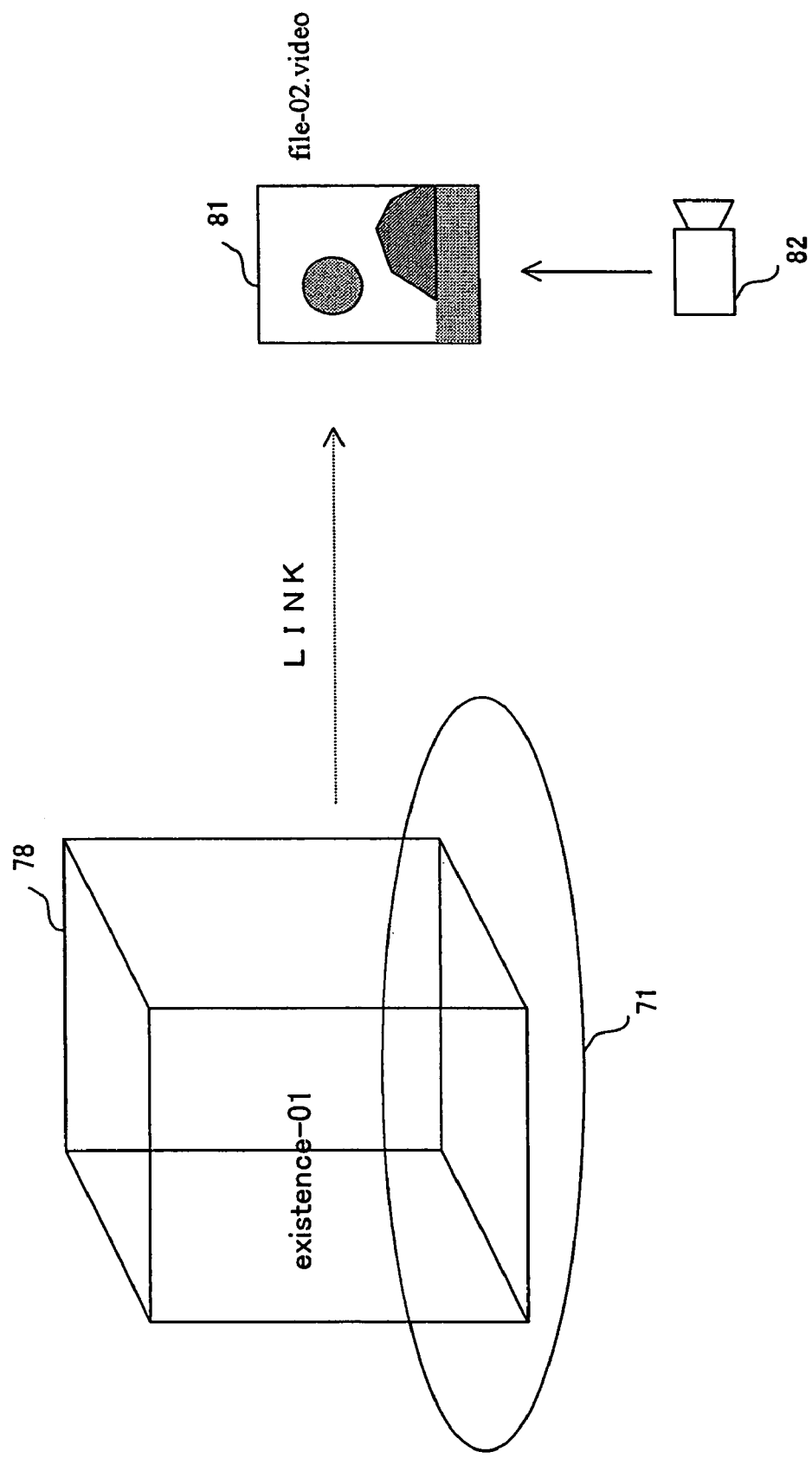
FIG. 11 is a schematic diagram showing a link to a scene.

FIG. 11 shows an example of a link to a scene in a real world. A video picture 81 of a scene is input to the web by a video camera 82 and stored as a virtual existence. A link from the virtual existence 78 to the video picture 81 can be coded as follows.

---
file-01.world
---
```
<world>
    <bind type = "link" to = "http://xxx/file-02.video">
        <existence id = "existence-01">
            <cube center = "1.0, 1.0, 1.0" length = "2.0">
        </existence>
    </bind>
</world>
```
---

In the case of a paste correlation, a virtual existence or a real existence such as characters, a picture, or the like in a virtual world or a real world is pasted to a virtual existence or a virtual region in the same virtual world or another virtual world. In the case, the pasted virtual existence or real existence is displayed on the virtual existence or virtual region in the original virtual world without necessity of user's selecting operation.

Figure 12:
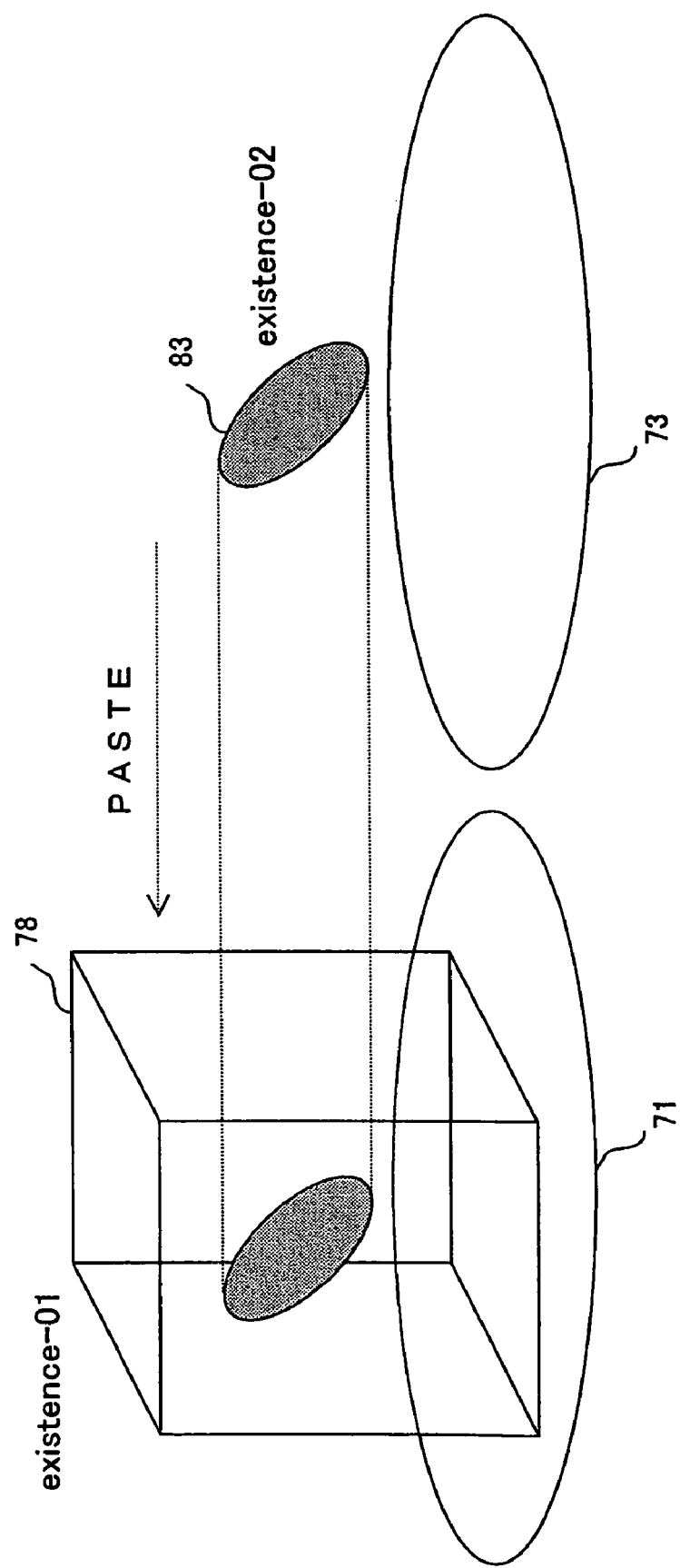
FIG. 12 is a schematic diagram showing a paste of a virtual existence.

FIG. 12 shows an example of a paste of a virtual existence. For example, a paste of a virtual existence 83 in a virtual world 73 to a virtual existence 78 in a virtual world 71 can be coded as follows.

---
fiele-01.world
---
```
<world>
    <bind type = "paste" from = "http://xxx/file-02.world/#existence-02">
        <existence id = "existence-01">
            <cube center = "1.0, 1.0, 1.0" length = "2.0">
        </existence>
    </bind>
</world>
```
--- type="paste" represents that the correlation type is paste. "from" is an attribute that represents a unique identifier of a correlated object.

Figure 13:
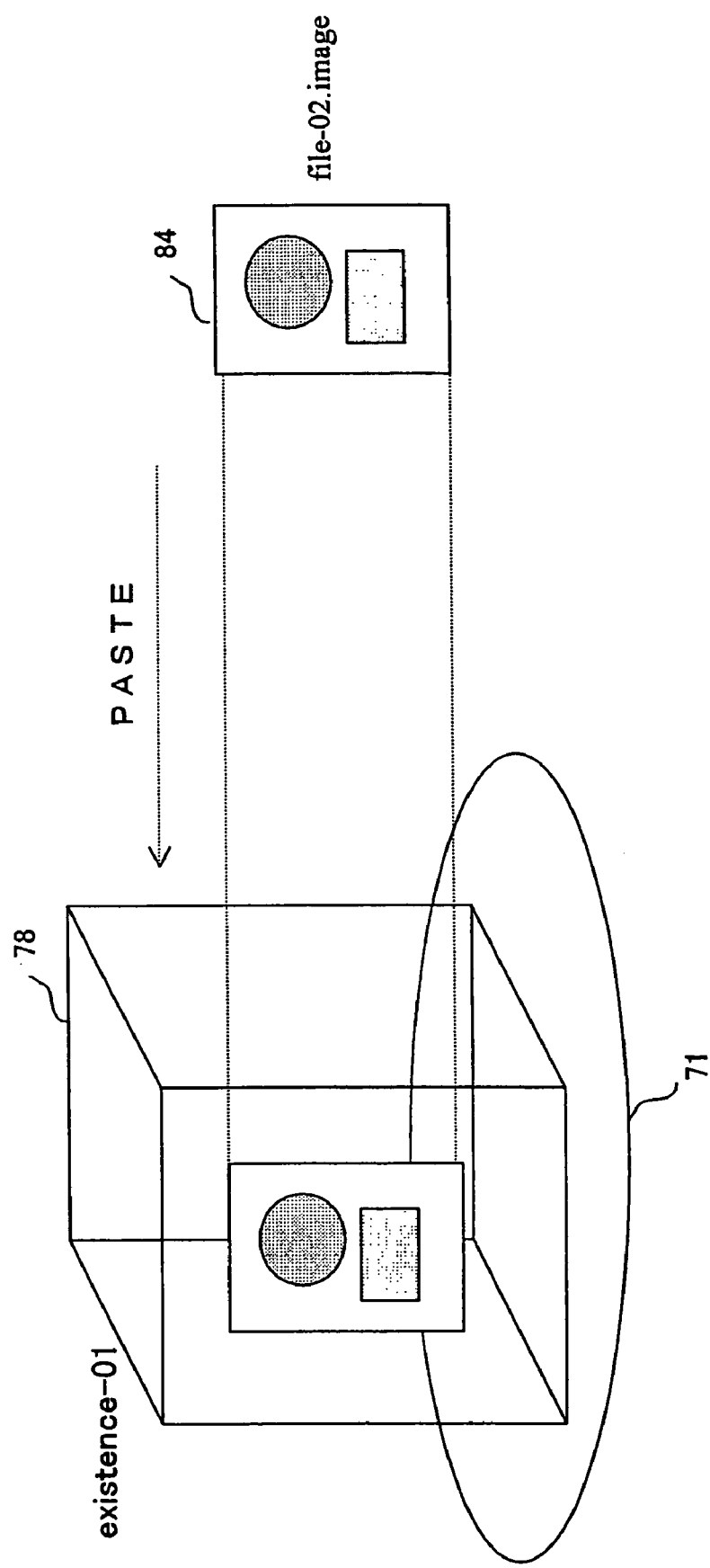
FIG. 13 is a schematic diagram showing a paste of a web page.

FIG. 13 shows an example of a paste of another web page. For example, a paste of a picture 84 of a web page to a virtual existence 78 can be coded as follows.

---
file-01.world
---
```
<world>
    <bind type = "paste" from = "http://xxx/file-02.image">
        <existence id = "existence-01">
            <cube center = "1.0, 1.0, 1.0" length = "2.0">
        </existence>
    </bind>
</world>
```
---

Figure 14:
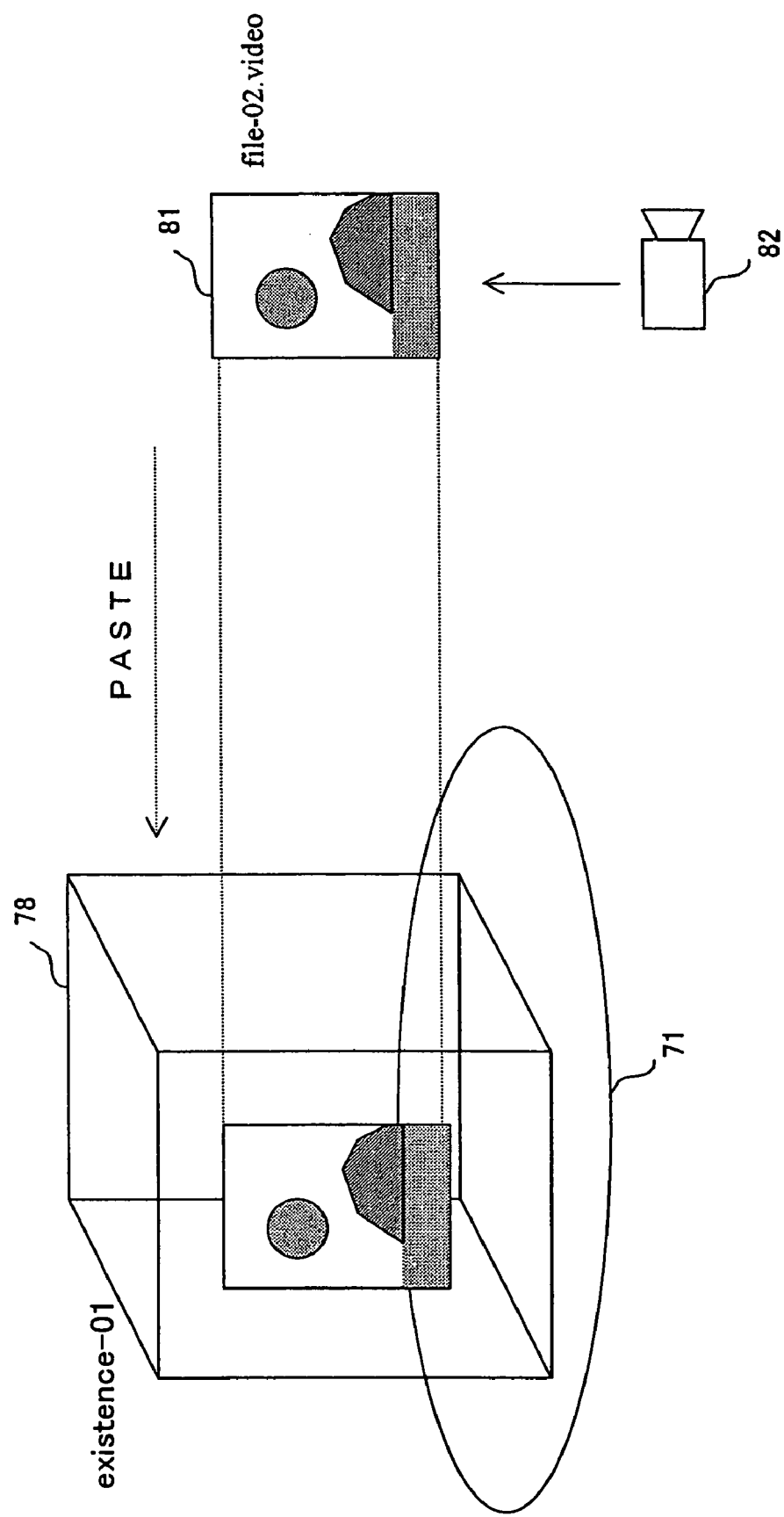
FIG. 14 is a schematic diagram showing a paste of a scene.

FIG. 14 shows an example of a paste of a scene in a real world. For example, a paste of a video picture 81 of a scene to a virtual existence 78 can be coded as follows.

---
file-01.world
---
```
<world>
    <bind type = "paste" from = "http://xxx/file-02.video">
        <existence id = "existence-01">
            <cube center = "1.0, 1.0, 1.0" length = "2.0">
        </existence>
    </bind>
</world>
```
---

In the case of a projection correlation, a virtual existence or a virtual region in a virtual world or a real existence or a real region in a real world is projected to a virtual region in the same virtual world or another virtual world. The projected virtual existence, virtual region, real existence, or real region is displayed in the virtual region in the original virtual world. A paste is equivalent to a special case of a projection.

Figure 15:
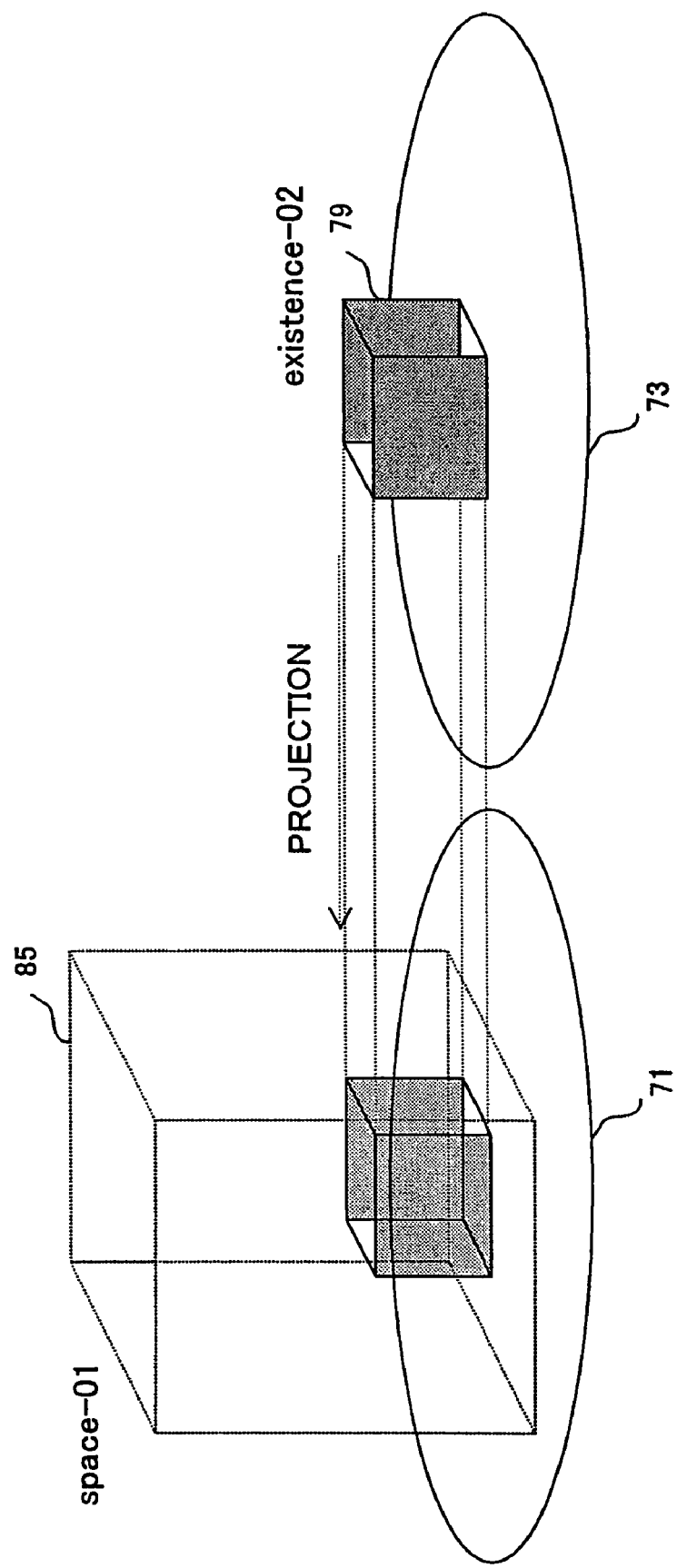
FIG. 15 is a schematic diagram showing a projection of a virtual existence.

FIG. 15 shows an example of a projection of a virtual existence. For example, a projection of a virtual existence 79 in a virtual world 73 to a virtual region 85 in a virtual world 71 can be coded as follows.

---
file-01.world
---
```
<world>
    <bind type = "project" from = "http://xxx/file-02.world/#existence-02">
        <space id = "space-01">
            <cube center = "1.0, 1.0, 1.0" length = "2.0">
        </space>
    </bind>
</world>
```
--- type="project" represents that the correlation type is projection. It should be noted that a link, a paste, and a projection can be used together at a time.

Next, with reference to FIGS. 16 to 18, examples of processes of the system will be described.

Figure 16:
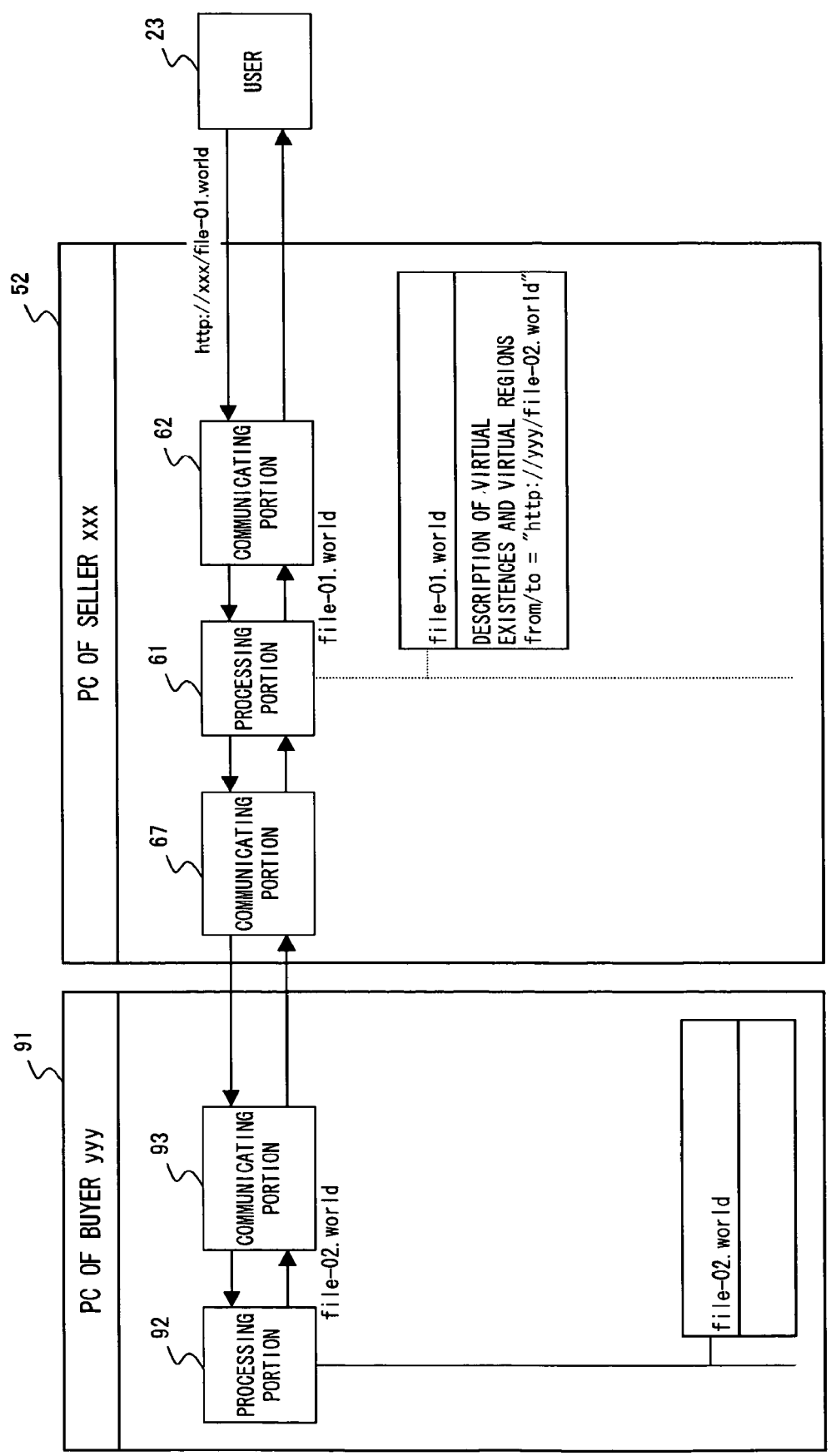
FIG. 16 is a schematic diagram showing a selling and buying process.

FIG. 16 shows an example of a selling and buying process for a virtual region. In FIG. 16, a PC 51 corresponds to a personal computer of a seller. As shown in FIG. 2B, data of a virtual world is provided to a user 23. In FIG. 16, a client 52 of a user 23 is omitted. A PC 91 corresponds to a personal computer of a buyer. The PC 91 comprises a processing portion 92 and a communicating portion 93.

The PC 51 stores a file file-01.world of a virtual world as a selling object. The PC 91 stores a file file-02.world of another virtual world. The file file-01.world describes a correlation with the file file-02.world. In the case, since the file file-02.world that describes a virtual region or a virtual existence of the buyer is under the control of the buyer, he or she can freely modify/change the data.

When the user 23 requests a file file-01.world of a desired virtual world, a processing portion 61 of the PC 51 extracts the information of the file. A communicating portion 62 transmits the information to the user 23. At that point, when necessary, the processing portion 61 requests the PC 91 for the correlated file file-02.world through a communicating portion 67.

The communicating portion 93 of the PC 91 notifies the processing portion 92 of the request. The processing portion 92 extracts the information of the file file-02.world and transmits it to the PC 51 through the communicating portion 93. The communicating portion 67 sends the received information to the processing portion 61. The processing portion 61 transmits the information to the user 23 through the communicating portion 62. As a result, data of a virtual region and a virtual existence of the buyer is provided to the user 23.

Figure 17:
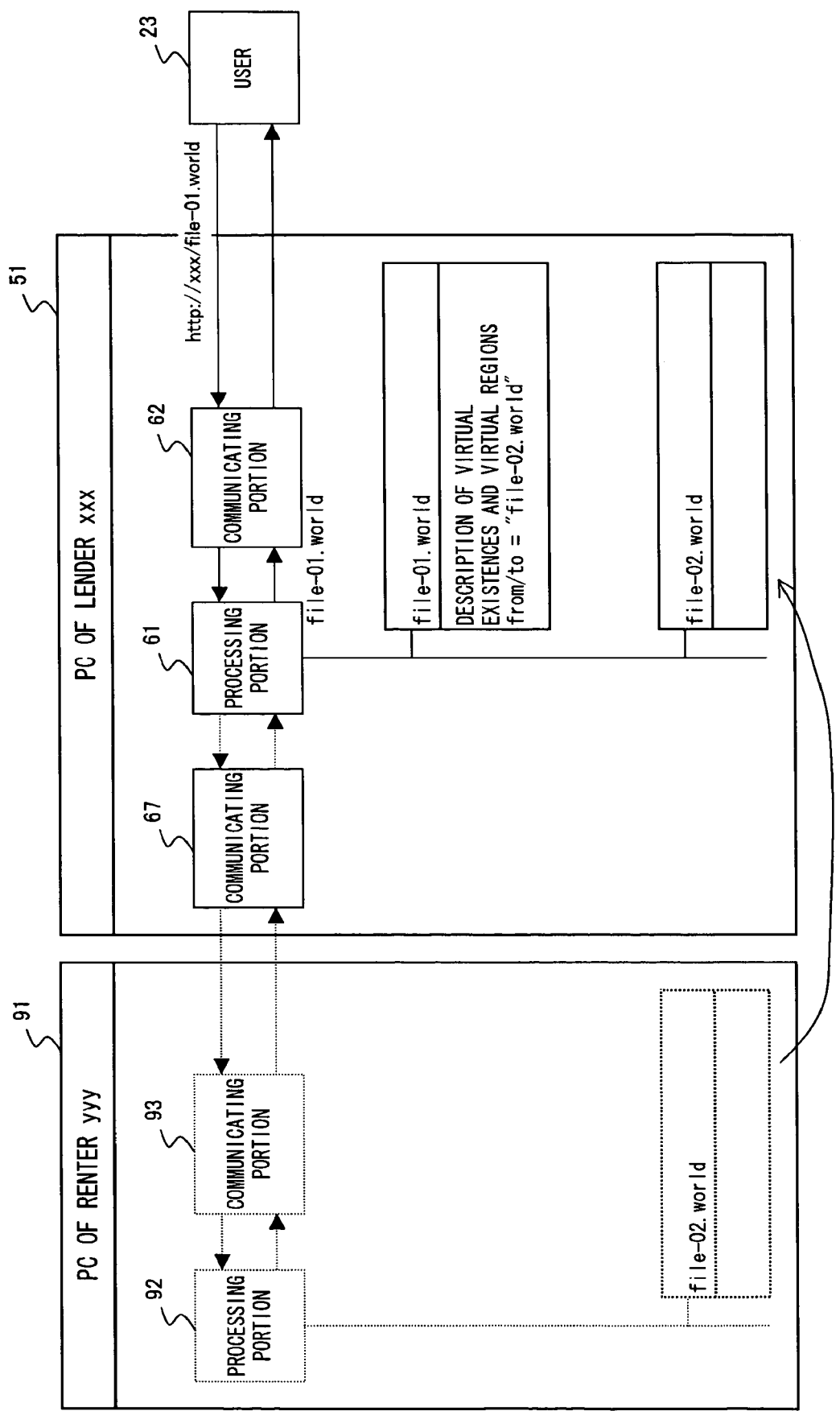
FIG. 17 is a schematic diagram showing a lending and renting process.

FIG. 17 shows an example of a lending and renting process for a virtual region. In FIG. 17, a PC 51 corresponds to a personal computer of a lender. A PC 91 corresponding to a personal computer of a renter. A file file-02.world of a virtual world of the renter is deposited from the PC 91 to the PC 51. The PC 51 stores both the file file-01.world and the file file02.world. In the case, since the file file-02.world is under the control of the lender, the renter cannot freely modify/change the data thereof.

When a user 23 requests a file file-01.world of a desired virtual world, the PC 51 transmits the information of the file to the user 23. At that point, when necessary, the PC 51 transmits information of the correlated file file-02.world to the user 23. As a result, the PC 51 provides data of a virtual region or a virtual existence of the renter to the user 23 without need to communicate with the PC 91.

Figure 18:
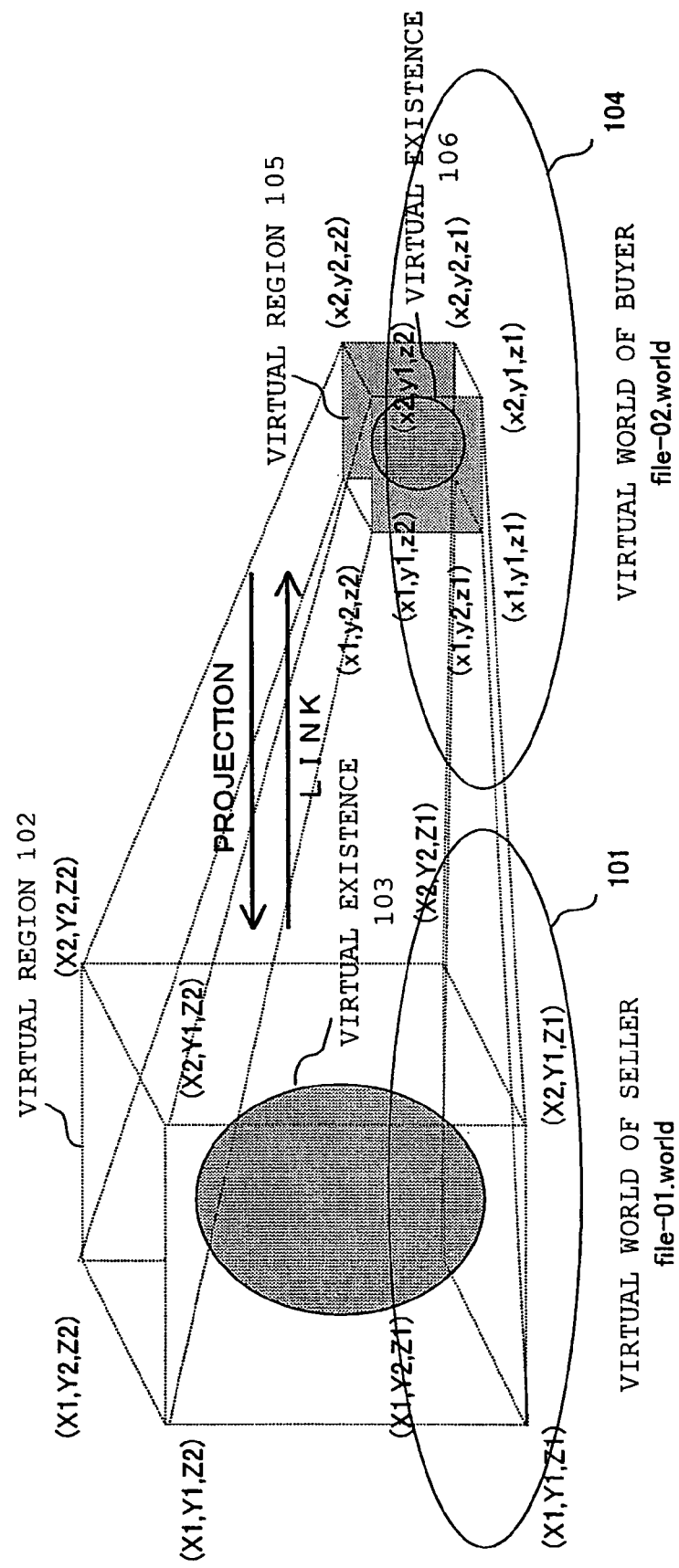
FIG. 18 is a schematic diagram showing a selling and buying process for a virtual region.

FIG. 18 shows an example of a selling and buying process for a virtual region. In FIG. 18, a virtual world 101 corresponds to a virtual world of a seller. The virtual world 101 is described in a file file-01.world. A virtual region 102 of a hexahedron in the virtual world 101 corresponds to a region that is sold. The virtual region 102 can be coded in the file file-01.world as follows.

| fiel-01.world |
| --- |
| <world><br>  <space id = "space-01"><br>    <polyhedra><br>      <point no = "1"> X1, Y1, Z1 </point><br>      ...<br>      <point no = "8"> X2, Y2, Z2 </point><br>      <surface> 1, 2, 3, 4 </surface><br>      ...<br>      <surface> 5, 6, 7, 8 </surface><br>    </polyhedra><br>  </space><br></world> |

When the unique identifier of the seller is http://xxx, the unique identifier of the virtual region 102 becomes http://xxx/file-01.world/#space-01. A virtual world 104 corresponds to a virtual world of a buyer. The virtual world 104 is described in a file file-02.world. A virtual region 105 of a hexahedron in the virtual world 104 corresponds to a region that the buyer wants to project to a virtual region 102 that is bought. A virtual existence 106 of a sphere in the virtual region 105 corresponds to an existence that the user wants to link form the virtual region 102. The virtual region 105 and the virtual existence 106 can be coded in the file file-02.world as follows.

| file-02.world |
| --- |
| <world><br>  <space id = "space-02"><br>    <polyhedra><br>      <point no = "1" > x1, y1, z1 </point><br>      ...<br>      <point no = "8" > x2, y2, z2 </point><br>      <surface> 1, 2, 3, 4 </surface><br>      ...<br>      <surface> 5, 6, 7, 8 </surface><br>    </polyhedra><br>  </space><br>  <existence id = "existence-02"><br>    <sphere center = "x, y, z" radius = "a"><br>  </existence><br></world> |

When the unique identifier of the buyer is http://yyy, the unique identifier of the virtual region 105 becomes http://yyy/file-02.world/#space-02 and the unique identifier of the virtual existence 106 becomes http://yyy/file-02.world/#existence-02.

When the seller and the buyer have made a sales contract, the virtual region 105 is projected to the virtual region 102 corresponding to the contract. The virtual region 102 is linked to the virtual existence 106. As a result, the file file-01.world is changed as follows.

| file-01.world |
| --- |
| <world><br>  <bind type = "project" from = "http"//yyy/file-02.world/#space-02"><br>  <bind type = "link" to = "http://yyy/file-02.world/#existence-02"><br>    <space id = "space-01"><br>      <polyhedra><br>        <point no = "1" > X1, Y1, Z1 </point><br>        ...<br>        <point no = "8" > X2, Y2, Z2 </point><br>        <surface> 1, 2, 3, 4 </surface><br>        ...<br>        <surface> 5, 6, 7, 8 </surface><br>      </polyhedra><br>    </space><br>  </bind><br>  </bind><br></world> |

When the virtual region 105 is projected to the virtual region 102, data of the virtual region 105 is displayed in the virtual region 102. When the user selects a position in the virtual region 102, a virtual existence 103 is displayed using data of the virtual existence 106 that is linked.

When a virtual region is lent or rented, the virtual world 101 corresponds to a virtual world of a lender. The virtual region 102 corresponds to a region that is lent. The virtual world 104 corresponds to a virtual world of a renter. The virtual region 105 corresponds to a region that the renter wants to project to the virtual region 102 that is rented. The virtual existence 106 corresponds to an existence that the user wants to link from the virtual region 102. When the lender and the renter made a rental contract, a projection and a link are performed corresponding to the contract. As a result, the file file-01.world is changed as follows. Unlike the case of the selling and buying process, in the case of the lending and renting process, it should be noted that the file file-02.world is stored on the lender side.

```
file-01.world

<world>
    <bind   type   =   "project"   from   =   "file-
02.world/#space-02">
        <bind   type   =   "link"   to   =   "file-
02.world/#existence-02">
            <space id = "space-01">
                <polyhedra>
                    <point no = "1" > X1, Y1, Z1 </point>
                    ...
                    <point no = "8" > X2, Y2, Z2 </point>
                    <surface> 1, 2, 3, 4 </surface>
                    ...
                    <surface> 5, 6, 7, 8 </surface>
                </polyhedra>
            </space>
        </bind>
    </bind>
</world>
```

Next, with reference to FIGS. 19 to 26, the selling and buying process and the lending and renting process will be described. In those processes, the right for correlating a virtual region to another region or an existence is handled as the right of use of a virtual region.

Figure 19:
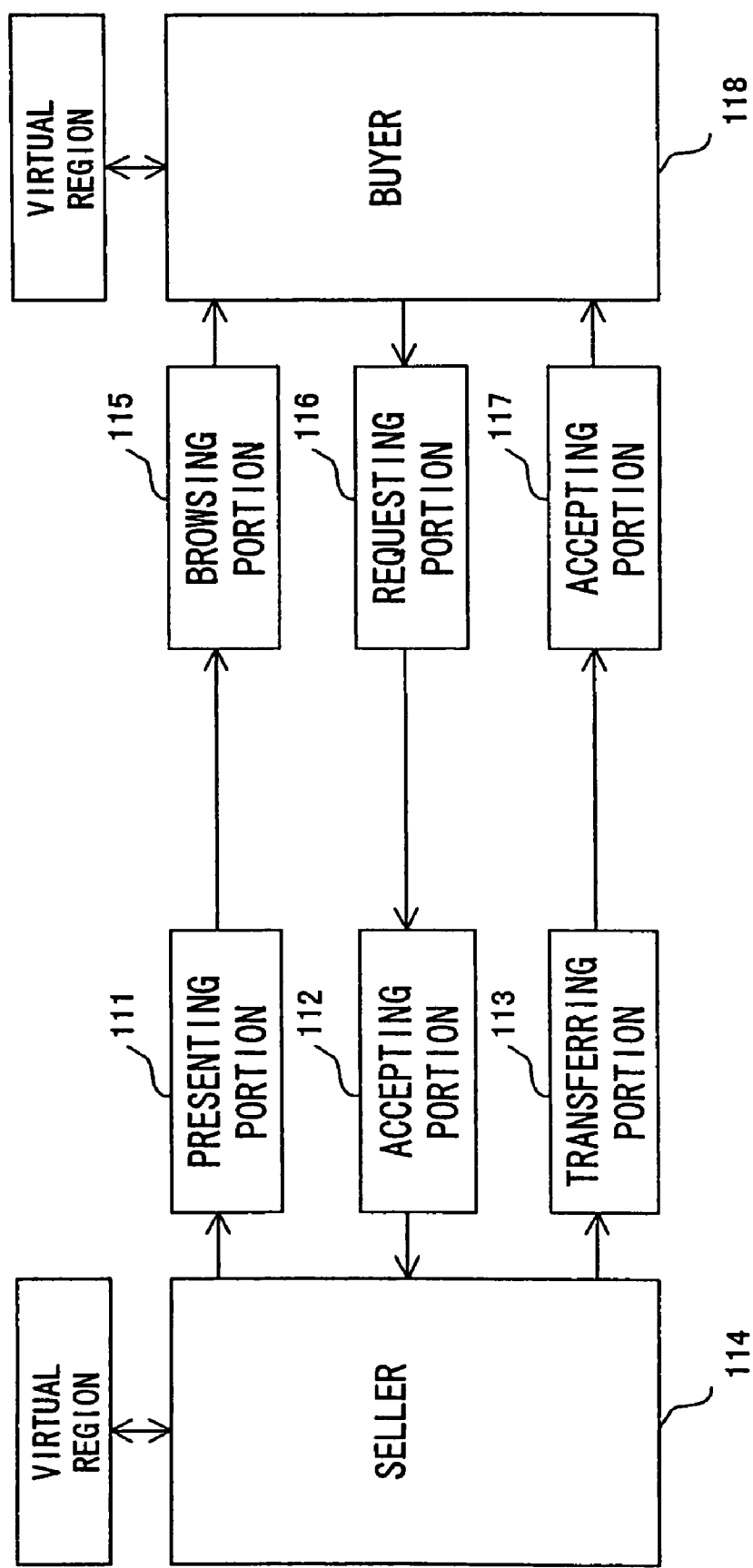
FIG. 19 is a schematic diagram showing a direct selling and buying process.

FIG. 19 shows the case that a seller directly sells a virtual region to a buyer. In FIG. 19, a presenting portion 111, an accepting portion 112, and a transferring portion 113 are disposed in a PC of a seller 114. For example, the presenting portion 111, the accepting portion 112, and the transferring portion 113 correspond to a combination of the processing portion 92 and the communicating portion 93 shown in FIG. 16. A browsing portion 115, a requesting portion 116, and a receiving portion 117 are disposed in a PC of a buyer 118. The browsing portion 115, the requesting portion 116, and the receiving portion 117 correspond to a combination of the processing portion 61 and the communicating portion 67 shown in FIG. 16.

Figure 20:
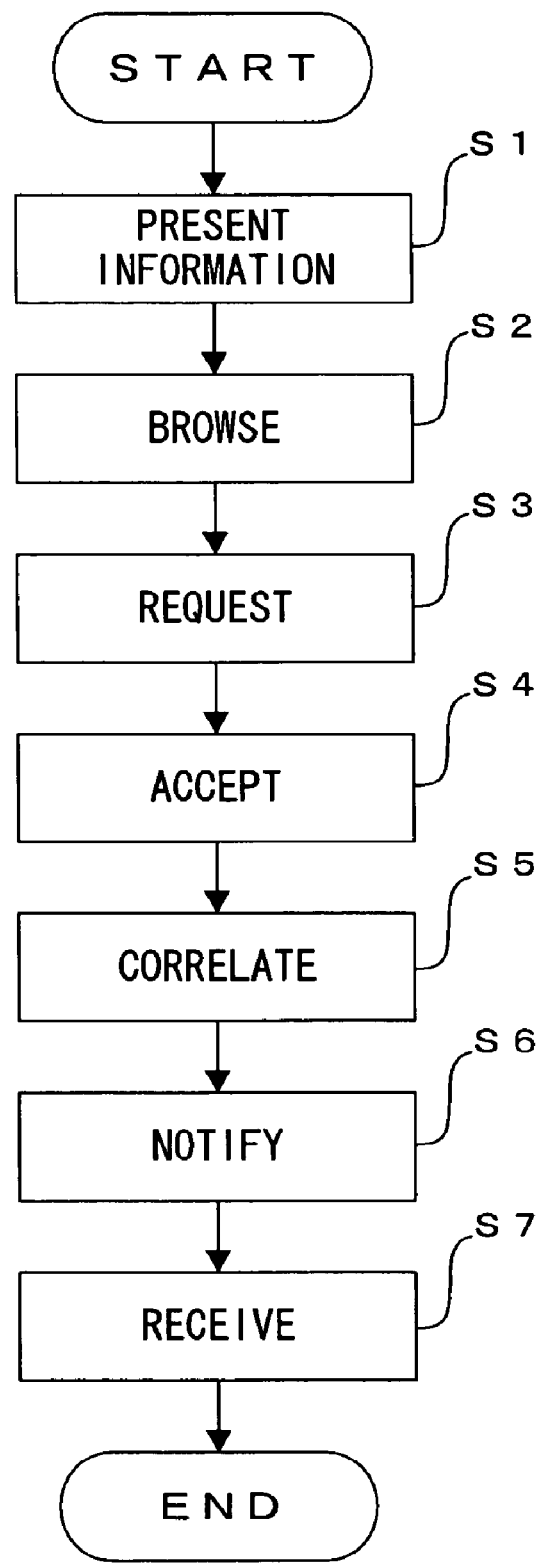
FIG. 20 is a flow chart showing a direct selling and buying process.

FIG. 20 is a flow chart showing the selling and buying process shown in FIG. 19. When the seller 114 sells a virtual region, the presenting portion 111 presents selling information including information of a unique identifier of a selling object, a message that represents that the seller 111 will sell the selling object, information about the seller 114, and the selling price to the public through a network (at step S1).

The buyer 118 browses the selling information through the browsing portion 115 (at step S2) and requests the seller 114 for buying the selling object (at step S3). At that point, the requesting portion 116 transmits request information including a message that represents the buyer 118 will buy the selling object, information about the buyer 118, and a unique identifier of a virtual existence, a virtual region, or the like to be correlated with the selling object to the accepting portion 112.

When the accepting portion 112 receives the request information (at step S4), the seller 114 adds the correlation information of the unique identifier contained in the request information to the description of the file of the selling object (at step S5). Thereafter, the transferring portion 113 notifies the buyer 118 of the correlated result so as to transfer the right of use of the virtual region to the buyer 118 (at step S6). When the receiving portion 117 receives the correlated result (at step S7), the buyer 118 stores the correlated result and completes the process.

Figure 21:
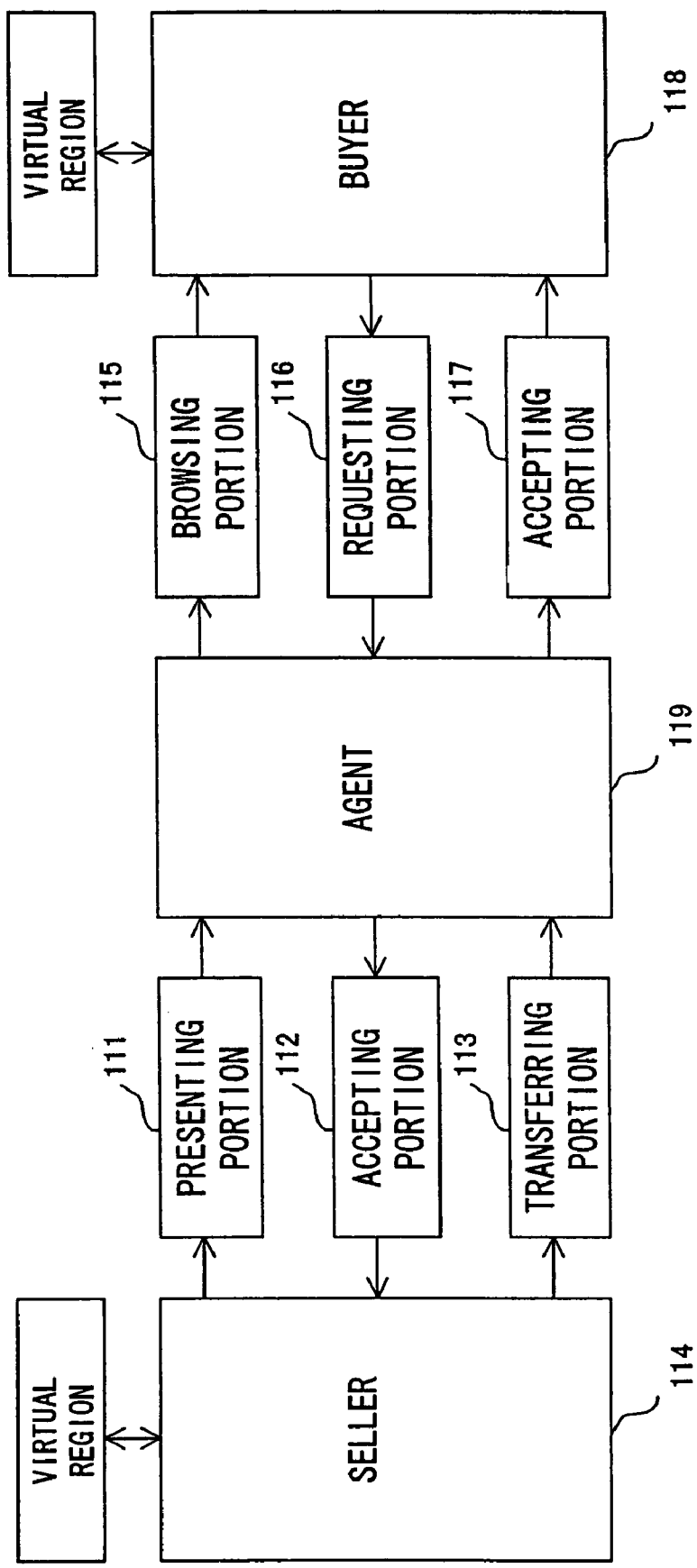
FIG. 21 is a schematic diagram showing an indirect selling and buying process.

FIG. 21 shows the case that a seller indirectly sells a selling object to a buyer through an agent. In FIG. 21, an agent 119 intermediates a communication between a seller 114 and a buyer 118 using a computer such as a server.

Figure 22:
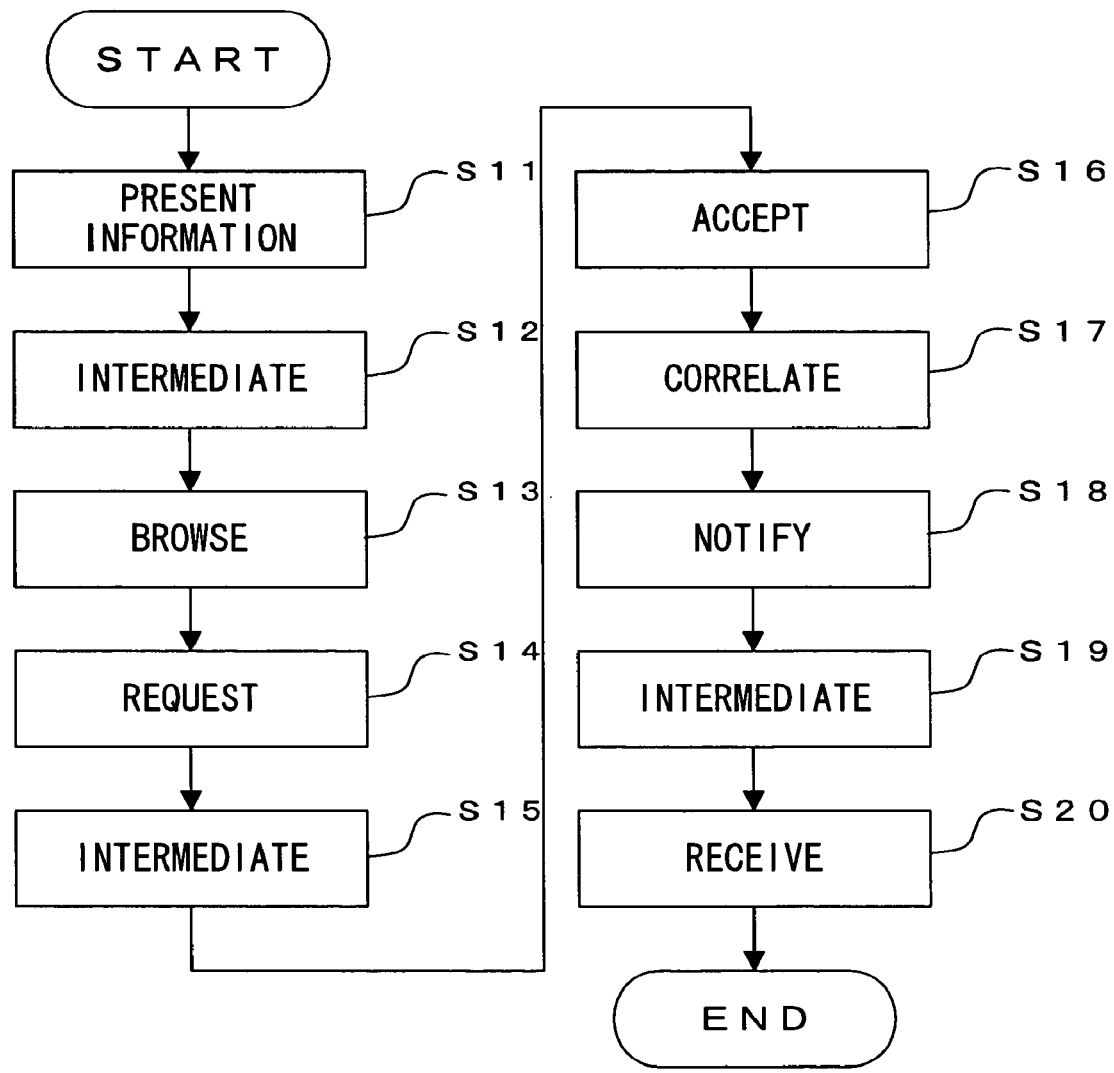
FIG. 22 is a flow chart showing an indirect selling and buying process.

FIG. 22 is a flow chart showing the selling and buying process shown in FIG. 21. When the seller 114 sells a selling object, a presenting portion 111 presents the above-described selling information to the agent 119 through a network (at step S11). The agent 119 presents the received selling information to the public through the network (at step S12).

The buyer 118 browses the selling information through a browsing portion 115 (at step S13). A requesting portion 116 transmits the request information to the agent 119 (at step S14). The agent 119 transmits the received request information to the seller 114 (at step S15)

When the accepting portion 112 receives the request information (at step S16), the seller 114 adds the correlation information to the description of the file of the selling object (at step S17). Thereafter, the transferring portion 113 notifies the agent 119 of the correlation information (at step S18). The agent 119 transmits the correlation information to the buyer 118 so as to transfer the right of use of the virtual region to the buyer 118 (at step S19). When the receiving portion 117 receives the correlation information (at step S20), the buyer 118 stores the correlation information and completes the process.

In each of the selling and buying processes shown in FIGS. 19 and 21, the money for the selling price is paid from the buyer to the seller in a predetermined method. When a whole virtual world is sold, the seller transfers a file that descries the virtual world to the buyer directly or through an agent. At that point, the file may be transmitted to the buyer through the network. Alternatively, the file recorded on a portable recording medium such as a floppy disk may be sent to the buyer.

Figure 23:
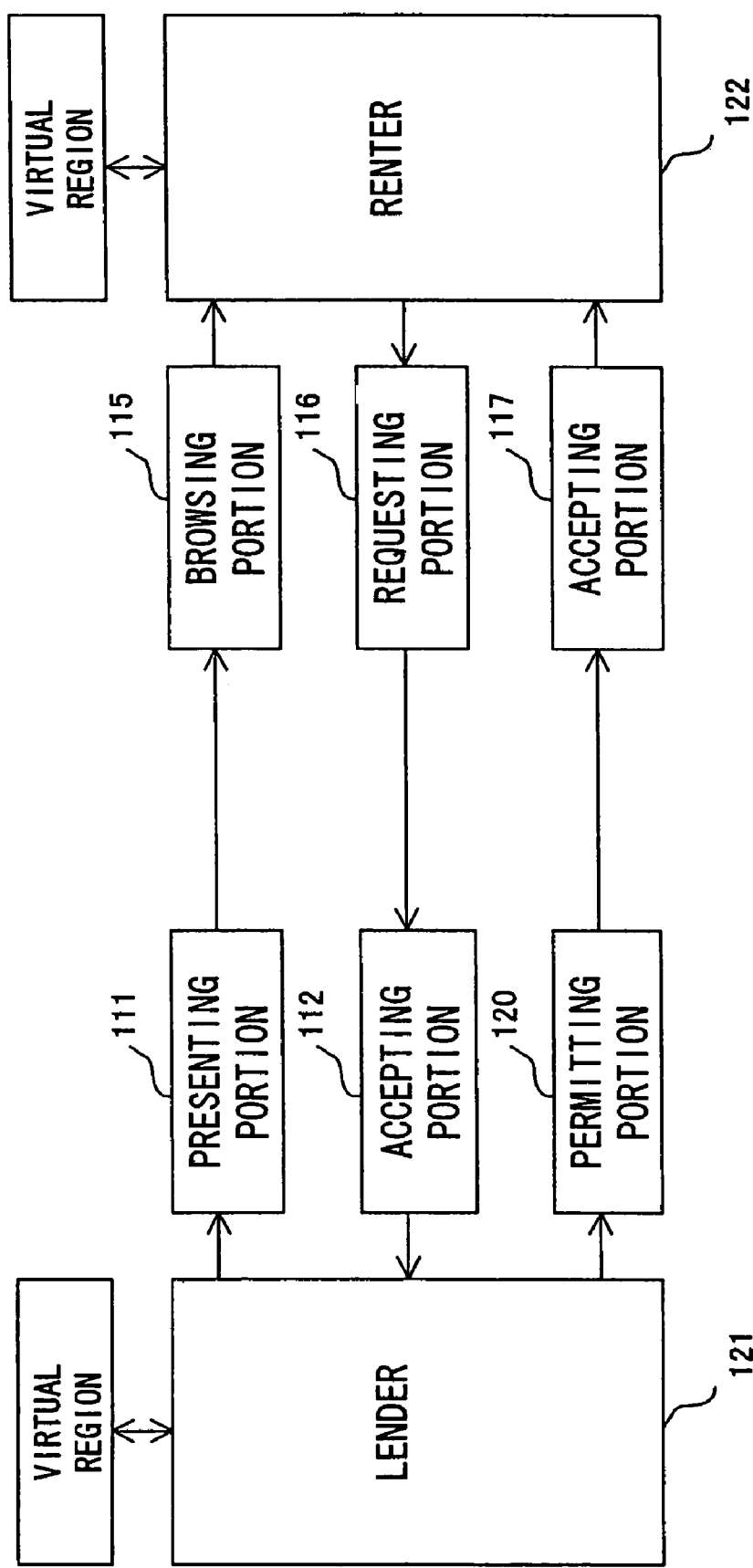
FIG. 23 is a schematic diagram showing a direct lending and renting process.

FIG. 23 shows the case that a lender directly lends a lending object to a renter. In FIG. 23, a presenting portion 111, an accepting portion 112, and a permitting portion 120 are disposed in a PC of a lender 121. For example, the presenting portion 111, the accepting portion 112, and the permitting portion 120 correspond to a combination of the processing portion 61 and the communicating portion 67 shown in FIG. 17. A browsing portion 115, a requesting portion 116, and a receiving portion 117 are disposed in a PC of a renter 122. The browsing portion 115, the requesting portion 116, and the receiving portion 117 correspond to a combination of the processing portion 92 and the communicating portion 93 shown in FIG. 17.

Since the flow chart of the lending and renting process is basically the same as the flow chart shown in FIG. 20, the lending and renting process will be described with reference to FIG. 20. When the lender 121 lends a virtual region, the presenting portion 111 presents lending information including information of a unique identifier of a lending object, a message that represents that the lender 121 will lend the lending object, information about the lender 121, and a lending fee to the public through a network (at step S1).

The renter 122 browses the lending information through the browsing portion 115 (at step S2) and requests the lender 121 for renting the lending object (at step S3). At that point, the requesting portion 116 transmits request information including a message that represents that the renter 122 will rent the lending object, information about the renter 122, and a file describing a virtual existence or a virtual region to be correlated with the lending object and deposits the file to the lender 121.

When the accepting portion 112 receives the request information (at step S4), the lender 121 adds the correlation information of the virtual existence or the virtual region described in the deposited file to the description of the file as the lending object (at step S5). Thereafter, the permitting portion 120 notifies the renter 122 of a message of the correlation so as to permit the renter 122 to rent the virtual region and lend the right of use thereof to the renter 122 (at step S6). When the receiving portion 117 receives the message (at step S7), the renter 122 stores the message and completes the process.

Figure 24:
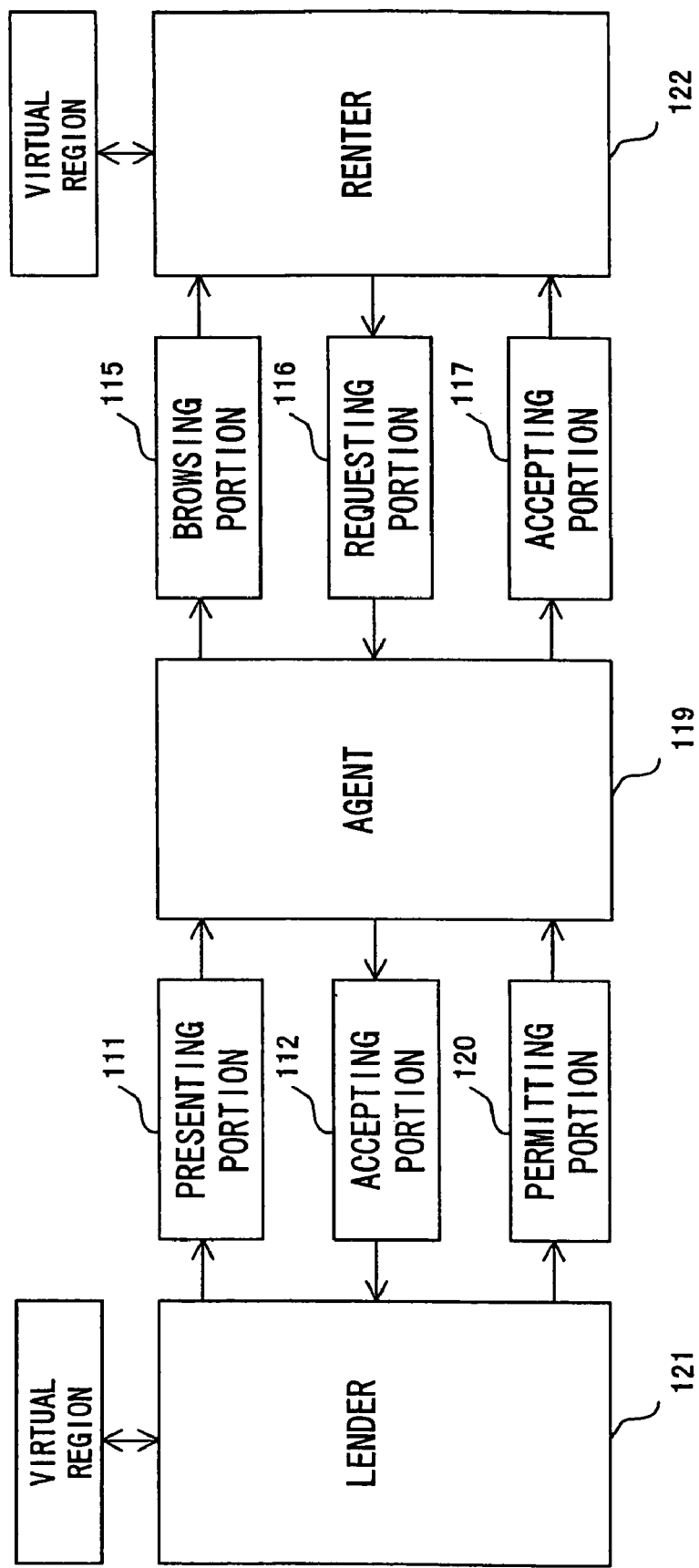
FIG. 24 is a schematic diagram showing an indirect lending and renting process.

FIG. 24 shows the case that a lender lends a lending object to a renter through an agent. In FIG. 24, an agent 123 intermediates a communication between a lender 121 and a renter 122 using a computer such as a server.

Since the flow chart of the lending and renting process shown in FIG. 24 is basically the same as the flow chart shown in FIG. 22, the lending and renting process will be described with reference to FIG. 22. When the lender 121 lends the lending object, a presenting portion 111 presents the above-described lending information to the agent 123 through a network (at step S11). The agent 123 presents the received lending information to the public through the network (at step S12).

The renter 122 browses the lending information through a browsing portion 115 (at step S13). A requesting portion 116 transmits the above-described request information to the agent 123 (at step S14). Thereafter, the agent 123 transmits the received request information to the lender 121 (at step S15).

When an accepting portion 112 receives the request information (at step S16), the lender 121 adds correlation information to the description of the file of the lending object (at step S17). Thereafter, a permitting portion 120 notifies the agent 123 of the correlation information. The agent 123 transmits the correlation information to the renter 122. As a result, the lender 121 permits the renter 122 to rent the virtual region and lends the right of use thereof to the renter 122 (at step S18). When a receiving portion 117 receives the correlation information (at step S20), the renter 122 stores the correlation information and completes the process.

In each of the lending and renting processes shown in FIGS. 23 and 24, the money for the lending fee is paid from the renter to the lender.

Figure 25:
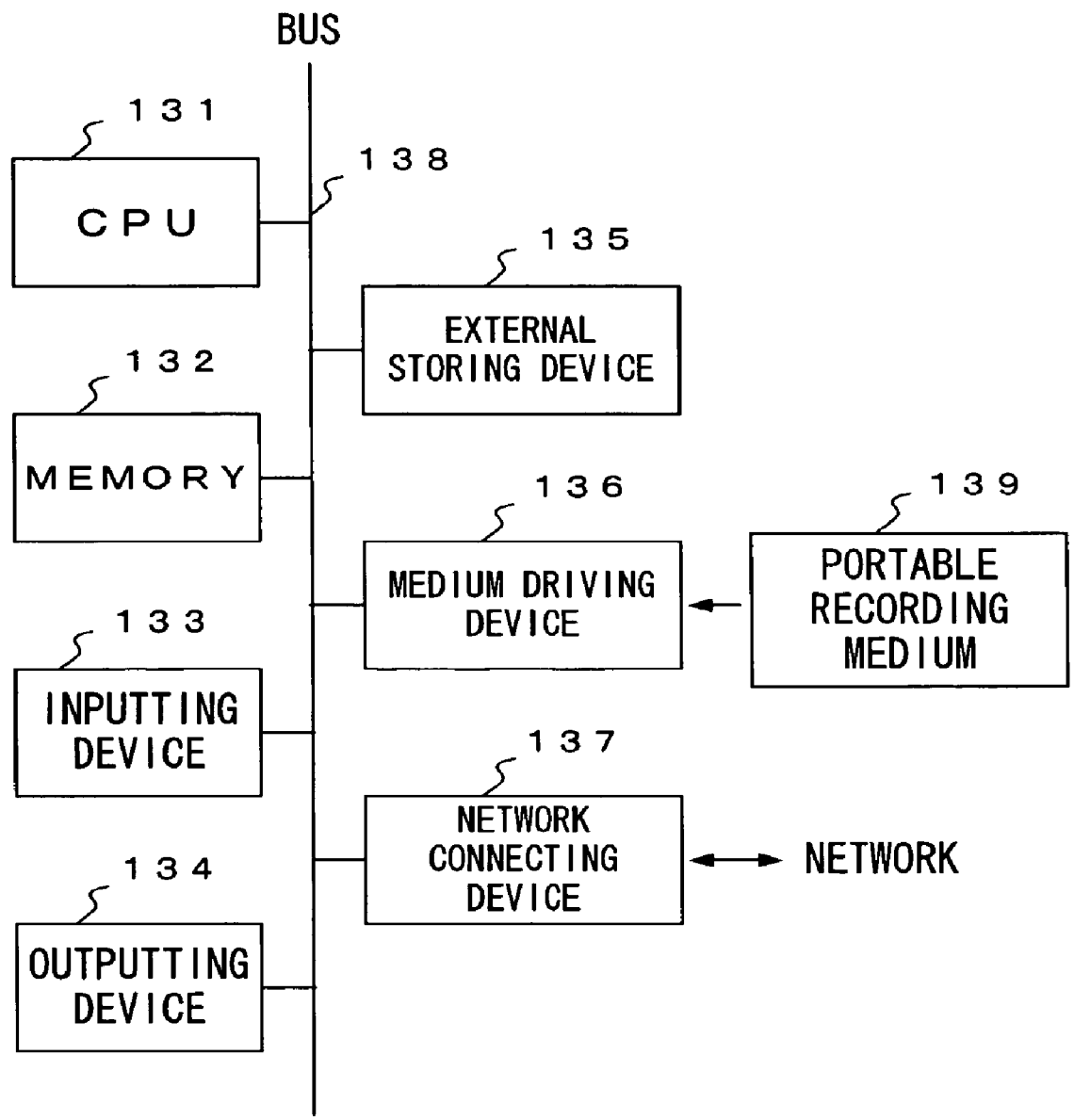
FIG. 25 is a block diagram showing the structure of an information processing apparatus.

The PCs 51, 52, and 91 shown in FIGS. 2B and 16 correspond to an information processing apparatus shown in FIG. 25. The information processing apparatus shown in FIG. 25 comprises a CPU (Central Processing Unit) 131, a memory 132, an inputting device 133, an outputting device 134, an external storing device 135, a medium driving device 136, and a network connecting device 137. These structural devices are mutually connected through a bus 138.

The processing portions 61, 64, and 92 shown in FIGS. 2B and 16 correspond to a combination of the CPU 131 and the memory 132. The inputting portion 65 and the outputting portion 66 shown in FIG. 2B correspond to the inputting device 133 and the outputting device 134, respectively. The communicating portions 62, 63, 67, and 93 shown in FIGS. 2B and 16 correspond to the network connecting device 137.

The memory 132 includes for example a ROM (Read Only Memory) and a RAM (Random Access Memory). The memory 132 stores a program and data used for the above-described processes. The CPU 131 executes the program using the memory 132 so as to perform required processes.

The inputting device 133 includes for example a keyboard, a pointing device, and a touch panel. The inputting device 133 allows the user to input commands and data. The outputting device 134 includes for example a display, a printer, and a speaker. The outputting device 134 prompts the user for data and outputs processed results.

The external storing device 135 includes for example a magnetic disc device, an optical device, a magneto-optical disc device, and a tape device. The information processing apparatus stores the program and data to the external storing device 135. When necessary, the information processing apparatus loads the program and data form the external storing device 135 to the memory 132.

The medium driving device 136 drives a portable recording medium 139 and accesses the recorded content thereof. The portable recording medium 139 includes for example a memory card, a floppy disk, a CD-ROM (Compact Disc Read Only Memory), an optical disc, and a magneto-optical disc that are recording mediums from which data can be read by any computer. The operator stores the above-described program and data to the portable recording medium 139. When necessary, the operator loads the program and data to the memory 132.

The network connecting device 137 is connected to an arbitrary communication network such as the Internet. The network connecting device 137 converts data corresponding to a communication. The information processing apparatus receives the above-described program and data from another device such as a server through the network connecting device 137. When necessary, the information processing apparatus loads the program and data to the memory 132.

Figure 26:
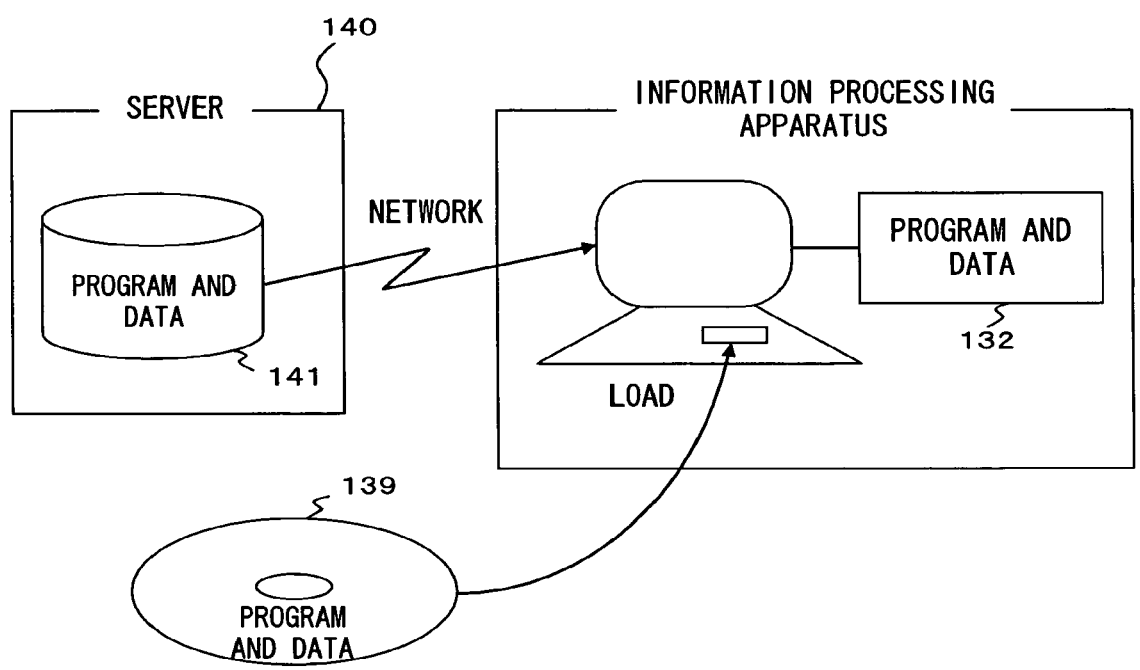
FIG. 26 is a schematic diagram showing recording media.

FIG. 26 shows computer readable recording media that allows a program and data to be supplied to the information processing apparatus shown in FIG. 25. The program and data stored in the portable recording medium 139 and a database 141 of a server 140 are loaded to a memory 132. The server 140 generates a propagation signal for propagating the program and data and transmits the propagation signal to the information processing apparatus through an arbitrary transmission medium on the network. The CPU 131 executes the program using the data and performs required processes.

According to the present invention, a virtual region of a virtual world in an information space such as the Internet can be sold, bought, lent, and rented. As a result, like the real world, the concept of real estates can be accomplished in the virtual world. Thus, new businesses such as real estate business and construction business can be accomplished.

Although the present invention has been shown and described with respect to a best mode embodiment thereof, it should be understood by those skilled in the art that the foregoing and various other changes, omissions, and additions in the form and detail thereof may be made therein without departing from the spirit and scope of the present invention.

What is claimed is:

1. A selling method, comprising:
 presenting selling information about a virtual region of a selling object in a first virtual world of a plurality of virtual worlds;
 accepting a message that represents that a buyer will buy the virtual region of the selling object, and that includes information about the buyer;
 transferring a right for correlating a processing object with the virtual region of the selling object to the buyer, the processing object being at least one of a virtual existence in the first virtual world, a virtual region in the first virtual world, a virtual existence in a second virtual world of the plurality of virtual worlds, a virtual region in the second virtual world, a real existence in a real world, and a real region in the real world; and correlating identification information of the processing object with identification information of the virtual region of the selling object and producing correlated identification information, the correlated identification information being at least one of a link correlation, a paste correlation, or a projection correlation, wherein:

the link correlation links the virtual existence in the first virtual world, the virtual region in the first virtual world, the virtual existence in the second virtual world or the virtual region in the second virtual world as the processing object to the virtual region of the selling object by correlating identification information of the processing object with identification information of the virtual region of the selling object, and the virtual region of the selling object displayed on a screen is switched to the processing object linked to the virtual region of the selling object when a user selects the virtual region of the selling object displayed on the screen;

the paste correlation pastes the virtual existence in the first virtual world, the virtual existence in the second virtual world or the real existence in the real world as the processing object to the virtual region of the selling object by correlating identification information of the processing object with identification information of the virtual region of the selling object, and the processing object pasted to the virtual region of the selling object is displayed in the virtual region of the selling object displayed on a screen; and the projection correlation projects the virtual existence in the first virtual world, the virtual region in the first virtual world, the virtual existence in the second virtual world, the virtual region in the second virtual world, the real existence in the real world or the real region in the real world as the processing object to the virtual region of the selling object by correlating identification information of the processing object with identification information of the virtual region of the selling object, and the processing object projected to the virtual region of the selling object is displayed in the virtual region of the selling object displayed on a screen.

2. A lending method, comprising:

presenting lending information about a virtual region of a lending object in a first virtual world of a plurality of virtual worlds;

accepting a message that represents that a renter will rent the virtual region of the lending object, and that includes information about the lender;

lending a right for correlating a processing object with the virtual region of the lending object to the renter, the processing object being at least one of a virtual existence in the first virtual world, a virtual region in the first virtual world, a virtual existence in a second virtual world of the plurality of virtual worlds, a virtual region in the second virtual world, a real existence in a real world, and a real region in the real world; and correlating identification information of the processing object with identification information of the virtual region of the lending object and producing correlated identification information, the correlated identification information being at least one of a link correlation, a paste correlation, or a projection correlation, wherein:

the link correlation links the virtual existence in the first virtual world, the virtual region in the first virtual world, the virtual existence in the second virtual world or the virtual region in the second virtual world as the processing object to the virtual region of the lending object by correlating identification information of the processing object with identification information of the virtual region of the lending object, and the virtual region of the lending object displayed on a screen is switched to the processing object linked to the virtual region of the lending object when a user selects the virtual region of the lending object displayed on the screen;

the paste correlation pastes the virtual existence in the first virtual world, the virtual existence in the second virtual world or the real existence in the real world as the processing object to the virtual region of the lending object by correlating identification information of the processing object with identification information of the virtual region of the lending object, and the processing object pasted to the virtual region of the lending object is displayed in the virtual region of the lending object displayed on a screen; and the projection correlation projects the virtual existence in the first virtual world, the virtual region in the first virtual world, the virtual existence in the second virtual world, the virtual region in the second virtual world, the real existence in the real world or the real region in the real world as the processing object to the virtual region of the lending object by correlating identification information of the processing object with identification information of the virtual region of the lending object, and the processing object projected to the virtual region of the lending object is displayed in the virtual region of the lending object displayed on a screen.

* * * * *